USOO5994790A

United States Patent [19]
Nagashima et al.

[11] Patent Number: 5,994,790
[45] Date of Patent: Nov. 30, 1999

[54] METHOD OF DETECTING ABNORMAL ELECTRIC CURRENT IN VEHICLE APPARATUS FOR DETECTING ABNORMAL ELECTRIC CURRENT IN VEHICLE AND POWER SUPPLY APPARATUS FOR VEHICLE

[75] Inventors: Yoshikazu Nagashima; Kaoru Kurita, both of Shizuoka; Yukihiko Umeda, Aichi, all of Japan

[73] Assignee: Yazaki Corporation, Tokyo, Japan

[21] Appl. No.: 09/053,764

[22] Filed: Apr. 2, 1998

[30] Foreign Application Priority Data

Apr. 4, 1997 [JP] Japan .................................. 9-086743

[51] Int. Cl.⁶ ..................................................... H02H 3/08
[52] U.S. Cl. ........................... 307/10.1; 307/31; 307/131; 361/87
[58] Field of Search .................................. 307/10.1, 131, 307/31, 30; 361/87; 315/307

[56] References Cited

U.S. PATENT DOCUMENTS

| | | | |
|---|---|---|---|
| 4,327,391 | 4/1982 | Grzebieblski | 361/31 |
| 4,477,748 | 10/1984 | Grubbs | 315/307 |
| 4,968,338 | 11/1990 | Sugiyama | 62/126 |
| 5,528,446 | 6/1996 | Sankaran et al. | 361/25 |
| 5,751,532 | 5/1998 | Kanuchok et al. | 361/87 |

*Primary Examiner*—Albert W. Paladini
*Attorney, Agent, or Firm*—Sughrue, Mion, Zinn, Macpeak & Seas, PLLC

[57] ABSTRACT

A method of detecting an abnormal electric current in a vehicle to detect passage of an abnormal electric current through an electric wire for establishing the connection between a load to which electric power is supplied and a power source, the method of detecting an abnormal electric current in a vehicle comprising the steps of: (a) detecting values of electric currents which pass through the electric wire at predetermined sampling intervals; (b) counting the number of times in a unit detection period that a sampled electric current having a value larger than a predetermined value is detected and determining passage of an abnormal electric current through the electric wire when the number of counts is larger than a first number of times; and (c) counting the number of times that a sampled electric current having a value larger than the predetermined value is detected in a unit detection period after the unit detection period in terms of time in a case where the number of counts is smaller than the first number of times and except for zero and determining passage of an abnormal electric current through the electric wire when the number of counts is larger than a second number of times.

46 Claims, 11 Drawing Sheets

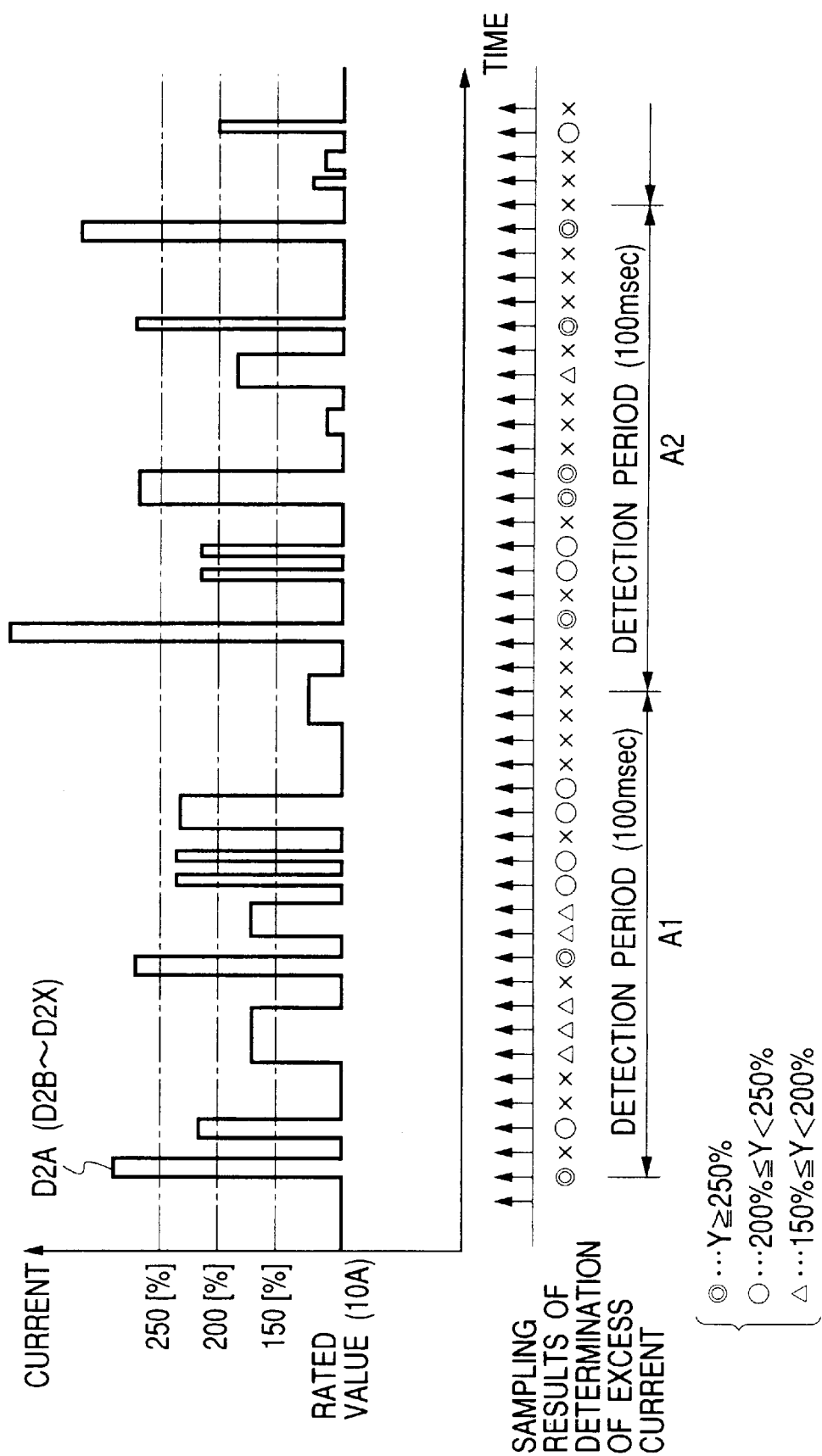

METHOD OF DETECTING ABNORMAL ELECTRIC CURRENT IN VEHICLE APPARATUS FOR DETECTING ABNORMAL ELECTRIC CURRENT IN VEHICLE AND POWER SUPPLY APPARATUS FOR VEHICLE

BACKGROUND OF INVENTION

The present invention relates to a method of detecting an abnormal electric current in a vehicle, an apparatus for detecting an abnormal electric current in a vehicle, a power supply apparatus for a vehicle, and more particularly to preventing damage of an insulating coating for an electric wire for establishing the connection between a power source portion and each load.

Hitherto, a general structure for preventing damage of an electric wire has been formed in such a manner that a fuse arranged to be burnt before the electric wire is damaged is provided for a current input stage of the electric wire so that the fuse is burnt if an excess current passes which will damage the electric wire.

However, the above-mentioned structure having the fuse has a problem in that damage of the electric wire cannot reliably be prevented. If a dead short circuit takes place which causes great electric currents to continuously pass through an electric wire, the fuse is burnt so that damage of the electric wire is prevented. If an intermittent short circuit (a rare short circuit) or an inter-line short circuit takes place, pulse-shape excess currents continuously pass through the electric wire. In the foregoing state, heat is accumulated in the insulating coating for the electric wire while the fuse is not burnt, causing the temperature to be raised. Thus, the insulating coating is damaged because of the raised temperature.

The reason for this is that the fusing characteristic of the fuse is slow to react to the excess current pulses as compared with the damage characteristic of the electric wire. Therefore, a phenomenon occurs in which heat accumulation which takes place due to the excess current pulses causes only the temperature of the electric wire to be raised. As a result, damage of the insulating coating occurs. If a fuse is selected which is able to protect the electric wire from being damaged even with the pulse-shape excess currents, the above-mentioned problem can be prevented. However, a fuse adaptable to the damage characteristic of the electric wire which varies in accordance with the type and length of the electric wire cannot easily be selected for each electric wire.

If an electric wire encounters an intermittent short circuit, a spark is made between the electric wire portion, which has encountered the intermittent short circuit, and the body of the vehicle. As a result, there is apprehension that the electric wire is damaged.

SUMMARY OF INVENTION

In view of the foregoing, an object of the present invention is to provide a method of detecting an abnormal electric current in a vehicle and an apparatus for detecting an abnormal electric current in a vehicle which are capable of reliably detecting passage of an abnormal electric current which will damage an electric wire which establishes the connection between the electric wire portion and a load and to suggest a power supply apparatus for a vehicle with which damage of an electric wire caused from an abnormal electric current can be prevented.

To solve the above-mentioned problems, a method of detecting an abnormal electric current in a vehicle according to a first embodiment of the invention is illustrated in FIGS. 7 and 8, while FIGS. 10 and 11 illustrate a method according to a second embodiment of the invention. Various aspects of the invention which are within the scope of the first and second embodiments are summarized below. In particular, first, second through eighth, tenth through thirteenth and fifteenth through seventeenth aspects of the invention are generally within the scope of the first embodiment of the invention, while third, ninth and fourteenth aspects are generally within the scope of the second embodiment. FIGS. 1 and 2 are examples of an apparatus for detecting an abnormal electric current in accordance with the first and second embodiments of the invention, respectively. FIG. 3 in an example of a power supply apparatus in accordance with either first or second embodiment of the invention.

According to the first aspect of the present invention there is provided a method for detecting an abnormal electric current in a vehicle in such a manner as to detect passage of an abnormal electric current through an electric wire for establishing the connection between a load to which electric power is supplied and a power source, the method of detecting an abnormal electric current in a vehicle comprising: an electric-current sampling step for detecting values of electric currents which pass through the electric wire at predetermined sampling intervals; a first abnormal-electric-current determination step for counting the number of times in a first unit detection period that a sampled electric current having a value larger than a predetermined value is detected and determining passage of an abnormal electric current through the electric wire when the number of counts is larger than a first number of times; and a second abnormal-electric-current determination step for counting the number of times that a sampled electric current having a second value larger than the predetermined value is detected in a unit detection period after the first unit detection period in terms of time in a case where the number of counts is smaller than the first number of times and is not zero and determining passage of an abnormal electric current through the electric wire when the number of counts is larger than a second number of times.

An apparatus for detecting an abnormal electric current in a vehicle according to the seventh aspect of the invention is, as shown in FIG. 1 which is an emdodiment thereof, an apparatus for detecting an abnormal electric current in a vehicle in such a manner as to detect passage of an abnormal electric current through an electric wire 200 when electric power is supplied from a power source portion 52, such as a battery, to a load 53 mounted on a vehicle through the electric wire 200, comprising: electric-current detection means 58, 70 for detecting an electric current value which is passing through the electric wire 200; sampling means 302-1 for sampling the detected electric current values at predetermined sampling intervals; comparison means 302-2 for subjecting each sampled electric current value and a predetermined threshold value TH to a comparison; a counter 304 for counting the number of times that the sampled electric current values are larger than the predetermined value TH in each period of time which is a predetermined period of time; and abnormality determination means 302-3 for determining that a passage of an abnormal electric current occurred through the electric wire 200 when the number of counts C in a certain period of time in each of the periods of time is not smaller than a first number of times CT1 and determining that a passage of an abnormal electric current occurred through the electric wire 200 when the number of counts C in the certain detection period is smaller than the first number of times CT1 and is not zero and when a number of counts C in a period of time following the certain period of time in terms of time is larger than a second number of times CT2.

In the above-mentioned structure, if pulse-shape electric currents pass through the electric wire 200 because of an intermittent short circuit, the sampling means 302-1 samples the values of the pulse-shape electric currents so that the number of counts C of the counter 304 is increased. If the number of counts in a certain period of time is not smaller than the first number of times CT1, there is apprehension that the electric wire 200 is damaged by the pulse-shape electric currents. Therefore, the abnormality determination means 302-3 determines that an abnormal electric current is passing through the electric wire 200.

If the number of counts in a certain period of time is a number except for zero and smaller than the first number of times CT1, whether the detected number of counts C is caused from an abnormal electric current or noise cannot be determined. Therefore, the abnormality determination means 302-3 again performs abnormality determination in accordance with the number of counts C in a period of time following the certain period of time. Then, whether or not the number of counts C is not smaller than the second number of times is determined. If the number of counts C is not smaller than the second number of times CT2, a determination is made that an abnormal electric current is passing through the electric wire 200.

As a result, passage of a pulse-shape electric currents, which will damage the electric wire 200, through the electric wire 200 can reliably be detected. Since the number of counts C of the counter 304 is made to be a maximum value if an abnormal electric current caused from a dead short circuit passes through the electric wire 200, also an abnormal electric current of the foregoing type can be detected. Thus, any abnormal electric current including an abnormal electric current caused from an intermittent short circuit which will damage the electric wire 200 can be detected.

A method of detecting an abnormal electric current in a vehicle according to the second aspect of the invention has a structure that when the number of counts C in the unit detection period in the first or second abnormal-electric-current determination step is zero, a determination is made that no abnormal electric current is passing through the electric wire 200, and when the number of counts C in the second abnormal-electric-current determination step is smaller than the second number of times CT2 and is not zero, processes similar to the first abnormal-electric-current determination step and the second abnormal-electric-current determination step are repeated in unit detection periods following the unit detection period in the second abnormal-electric-current determination step.

An apparatus for detecting an abnormal electric current in a vehicle according to the eighth aspect of the invention has a structure that the abnormality determination means 302-2 according to the seventh aspect of the invention determines that no abnormal electric current is passing through the electric wire 200 when the number of counts C in the certain period of time or the number of counts C in the period of time following the certain period of time in terms of time is zero and repeats the abnormal-electric-current determination step in accordance with the number of counts C in the latter period of time when the number of counts C in the period of time following the certain period of time in terms of time is smaller than the second number of times and is not zero.

When the number of counts C in a certain period of time is zero, there is substantially no possibility that an abnormal electric current passes through the electric wire 200. Therefore, a determination is made that no abnormal electric current is passing through the electric wire 200 and thus the process is ended. If the number of counts C in the latter period of time in terms of time is smaller than the second number of times CT2 and is not zero, there is apprehension that the electric current passing through the electric wire 200 is an abnormal electric current. Therefore, the determination step is again performed. As a result, an abnormal electric current passing through the electric wire 200 can furthermore readily be detected.

A method of detecting an abnormal electric current in a vehicle according to the third aspect of the present invention in such a manner as to detect passage of an abnormal electric current through an electric wire for establishing the connection between a load to which electric power is supplied and a power source, the method of detecting an abnormal electric current in a vehicle comprising: an electric-current sampling step for detecting values of electric currents which pass through the electric wire at predetermined sampling intervals; a first abnormal-electric-current determination step for assigning a first weighting coefficient to the number of times that a sampled electric current having a value larger than a first threshold value is detected in a unit detection period, assigning a second weighting coefficient smaller than the first weighting coefficient to the number of times that a sampled electric current having a value smaller than the first threshold value and not smaller than the second threshold value is detected and adding up the numbers of times that weight assignment is performed so as to determine that an abnormal electric current is passing through the electric wire when the added numbers of times that the weight assignment is performed are larger than a first number of times; and a second abnormal-electric-current determination step in which when the added numbers of times that the weight assignment is performed in the unit detection period is smaller than a first number of times and except for zero, the first weighting coefficient is assigned to the number of times that a sampled electric current having a value larger than the first threshold value is detected in a unit detection period following the unit detection period in terms of time, the second weighting coefficient is assigned to the number of times that a sampled electric current having a value smaller than the first threshold value and not smaller than the second threshold value is detected, and the numbers of times that the weight assignment is performed are added up so as to determine that an abnormal electric current is passing through the electric wire when the added numbers of times that the weight assignment is performed is larger than a second number of times.

An apparatus for detecting an abnormal electric current in a vehicle according to the ninth asepct of the invention is, as shown in FIG. 2 which is an embodiment thereof, an apparatus for detecting an abnormal electric current in a vehicle in such a manner as to detect passage of an abnormal electric current through an electric wire 200 when electric power is supplied from a power source portion 52, such as a battery, to a load 53 mounted on a vehicle through the electric wire 200, the apparatus for detecting an abnormal electric current in a vehicle comprising: electric-current detection means 58, 70 for detecting an electric current value which is passing through the electric wire 200; sampling means 302-1 for sampling the detected electric current values at predetermined sampling intervals; comparison means 302-2 for subjecting each sampled electric current value, a first threshold value TH1 and a second threshold value TH2 smaller than the first threshold value TH1 to comparisons; first and second counters 304-1 and 304-2 for counting the number of times Cα of the sampled electric current values not smaller than the first threshold value TH1 and the number of times Cβ of the sampled electric current values smaller than the first threshold value TH1 and not smaller than the second threshold value TH2 respectively in each period of time which is a predetermined period of time; weight addition means 302-5 for assigning a first weighting coefficient W1 to the number of times Cα counted by the first counter 304-1, assigning a second weighting coefficient W2 smaller than the first weighting coefficient W1 to the number of times Cβ counted by the second counter 304-2 and adding up the numbers of times that the weight assignment is performed; and abnormality determination means 302-6 for determining passage of an abnormal electric current through the electric wire 200 when the number of times Cγ that the weight assignment is performed in a certain period of time is not smaller than a first number of times CT1' and determining passage of an abnormal electric current through the electric wire 200 when the number of times Cγ that the weight assignment is performed in the certain detection period is smaller than the first number of times CT1' and is not zero and when a number of times Cγ that the weight assignment is performed in a period of time following the certain period of time in terms of time is larger than a second number of times CT2'.

The structure is arranged as described above. If pulse-shape electric currents pass through the electric wire 200 because of an intermittent short circuit, the sampling means 302-1 samples the pulse-shape electric currents. The sampled electric current values are, by the comparison means 302-2, sectioned into those not smaller than the first threshold value TH1 and those between the second threshold value TH2 and the first threshold value TH1. Then, the first and second counters 304-1 and 304-2 individually count the numbers of times Cα and Cβ in the corresponding periods of time.

The number of counts Cα not smaller than the first threshold value TH1 is a value relating to the damage of the electric wire 200 as compared with the number of counts Cβ between the second threshold value TH2 and the first threshold value TH1. Therefore, the weight addition means 302-5 assigns a heavier weight to the number of counts Cα as compared with the weight which is assigned to the number of counts Cβ. Then, the numbers of times that the weight assignment is performed are added up. If the number of times Cγ that the weight assignment is performed is larger than the first number of times CT1', the abnormality determination means 302-6 determines that an abnormal electric current which will damage the electric wire 200 is passing through the electric wire.

If the number of times Cγ that the weight assignment is performed is the number of times except for zero and smaller than the first number of times CT1', whether the detected number of times Cγ that the weight assignment is performed is caused from an abnormal electric current or noise cannot be determined. Therefore, the abnormality determination means 302-6 again performs the abnormality determination in accordance with the number of times Cγ that the weight assignment is performed to determine whether or not the number of times Cγ that the weight assignment is performed is larger than the second number of times CT2'. If the number of times Cγ that the weight assignment is performed is larger than the second number of times CT2', the abnormality determination means 302-6 determines that an abnormal electric current is passing through the electric wire 200.

As compared with the method and apparatus for detecting an abnormal electric current according to the first and seventh aspects respectively, an abnormal electric current which will damage the electric wire can furthermore reliably be detected because the passage of an abnormal electric current is determined in accordance with the number of times Cγ obtained by weighting and adding in accordance with the sampled electric current value.

A method of detecting an abnormal electric current in a vehicle according to the fourth aspect of the present invention maybe incorporated in any one of the first to third aspects, and requires that the processes in the first and second abnormal-electric-current determination steps are not performed until a predetermined period of time elapses from the moment in time at which supply of electric power to the load has been started, and the first and second abnormal-electric-current determination steps are performed after the predetermined period of time has elapsed.

An apparatus for detecting an abnormal electric current in a vehicle according to the tenth aspect of the present invention maybe incorporated in a structure according to any one of the seventh to ninth aspects, and requires that the determination of the abnormal electric current is not performed until a predetermined period of time elapses from the moment in time at which supply of electric power to the load 53 has been started.

In the above-mentioned structure, a rush current having a current value larger than that of a rated current passes through each load 53 in, for example, a lamp system or a motor, until the temperatures of the loads 53 are raised to a certain temperature level for a certain period of time from start of supply of electric power to the loads 53. Therefore, detection of an abnormal electric current is not performed in the above-mentioned period of time. As a result, incorrect determination that the rush current, which is substantially a normal electric current, is determined as an abnormal electric current can be prevented.

A method of detecting an abnormal electric current in a vehicle according to the fifth aspect of the present invention maybe incorporated in any one of the first to fouth aspects, and requires that the second number of times in the second abnormal-electric-current determination step is smaller than the first number of times.

An apparatus for detecting an abnormal electric current in a vehicle according to the eleventh aspect of the invention maybe incorporated in a structure according to any one of the seventh to tenth aspects, and requires that the second number of times CT2 or CT2' is smaller than the first number of times CT1 or CT1'.

The structure is arranged as described above. If a sampled excess currents are detected in a certain detection period of time by the number of times smaller than the first number of times CT1 or CT1' and except for zero, passage of an abnormal electric current is determined even in a case in which the number of times of the sampled excess currents detected in the detection period of time following the certain detection period of time in terms of time is smaller than the first number of times CT1 or CT1'. The reason for this will now be described. Since one or more sampled excess currents have been detected in the previous detection period of time, setting of the threshold value is not required to the large number of times in the following detection period of time in terms of time as compared with the first number of times CT1 or CT1' in the previous detection period of time. In consideration of a fact that the sampled excess currents have been detected in the successive detection periods of time, the determination of the passage of an abnormal electric current is permitted.

A method of detecting an abnormal electric current in a vehicle according to the sixth aspect of the present invention maybe incorporated in any one of the first to fifth aspects, and requires that the first and second numbers of times are determined in consideration of a damage characteristic of the electric wire.

An apparatus for detecting an abnormal electric current in a vehicle according to the twelveth aspect of the present invention has a structure wherein the first and second numbers of times CT1, CT1' and CT2 or CT2' according to any one of the seventh to eleventh aspects are determined in consideration of a damage characteristic of the electric wire 200.

In the above-mentioned structure, the first and second numbers of times CT1, CT1' and CT2 or CT2' are determined in consideration of the damage characteristic of each electric wire 200 which varies depending on the diameter, material and the like of the electric wire 200. Therefore, a further accurate process for detecting an abnormal electric current can be performed in accordance with the damage characteristic of each electric wire 200. As a result, damage of the electric wire 200 can furthermore reliably be prevented.

A power supply apparatus for a vehicle according to the thirteenth aspect of the present invention and, as shown in FIG. 1 which is a basic structural view, arranged in such a manner that electric power is supplied from a power source portion 52, such as a battery, to a load 53 mounted on the vehicle through an electric wire 200, the power supply apparatus for a vehicle comprising: electric-current detection means 58 or 70 for detecting an electric current value which is passing through the electric wire 200; sampling means 302-1 for sampling the detected electric current values at predetermined sampling intervals; comparison means 302-2 for subjecting each sampled electric current value and a predetermined threshold value TH to a comparison; a counter 304 for counting the number of times C of the sampled electric current values larger than the predetermined value TH in each period of time which is a predetermined period of time; abnormality determination means 302-3 for determining passage of an abnormal electric current through the electric wire 200 when the number of counts C in a certain period of time in each of the periods of time is not smaller than a first number of times CT1 and determining passage of an abnormal electric current through the electric wire 200 when the number of counts C in the certain detection period is smaller than the first number of times CT1 and except for zero and when a number of counts C in a period of time following the certain period of time in terms of time is larger than a second number of times CT2; and control means 302-4 or 55 for interrupting an electric current which passes through the electric wire 200 by switching off a switch 54 provided on the electric wire 200 for establishing the connection between the power source portion 52 and the load 200 when an abnormal electric current has been detected by the abnormality determination means 302-3.

The structure is arranged as described above. If pulse-shape electric currents caused from an intermittent short circuit pass through the electric wire 200, the sampling means 302-1 samples the values of the pulse-shape electric currents so that the number of counts C of the counter 304 is increased. If the number of counts in a certain period of time is not smaller than the first number of times CT1, there is apprehension that the electric wire 200 is damaged by the pulse-shape electric currents. Therefore, the abnormality determination means 302-3 determines passage of an abnormal electric current through the electric wire 200. If the above-mentioned determination is made, the control means 302-4 or 55 switches the switch 54 off so that supply of an electric current to the electric wire 200 is interrupted.

If the number of counts in a certain period of time is the number except for zero and smaller than the first number of times, whether the detected number of counts C is caused from an abnormal electric current or noise cannot be determined. Therefore, the abnormality determination means 302-3 again performs the abnormality determination in accordance with the number of counts C in a period of time following the certain period of time. Whether or not the number of counts C is not smaller than the second number of times CT2 is determined. If the number of counts C is not smaller than the second number of times CT2, passage of an abnormal electric current through the electric wire 200 is determined. If the foregoing determination is made, the control means 302-4 or 55 switches the switch 54 off so that supply of an electric current to the electric wire 200 is interrupted.

As a result, passage of a pulse-shape electric currents, which will damage the electric wire 200, through the electric wire 200 can reliably be detected. Thus, supply of an electric current to the electric wire 200 can be interrupted if the foregoing abnormal electric current passes through the electric wire 200. Since the number of counts C of the counter 304 is made to be a maximum value if an abnormal electric current caused from a dead short circuit passes through the electric wire 200, also an abnormal electric current of the foregoing type can be detected. Thus, any abnormal electric current including an abnormal electric current caused from an intermittent short circuit which will damage the electric wire 200 can be detected. If an abnormal electric current of the foregoing type passes through the electric wire 200, supply of an electric current to the electric wire 200 is interrupted. As a result, damage of the electric wire 200 can reliably be prevented.

A power supply apparatus for a vehicle according to the fourteenth aspect of the present invention is, as shown in FIG. 2 which is an embodiment thereof, arranged in such a manner that electric power is supplied from a power source portion 52, such as a battery, to a load 53 mounted on the vehicle through an electric wire 200, the power supply apparatus for a vehicle comprising: electric-current detection means 58 or 70 for detecting an electric current value which is passing through the electric wire 200; sampling means 302-1 for sampling the detected electric current values at predetermined sampling intervals; comparison means 302-2 for subjecting each of sampled electric current values, a first threshold value TH1 and a second threshold value TH2 to comparisons; counters for counting the number of times Cα of the sampled electric current values not smaller than the first threshold value TH1 and the number of times Cβ of the sampled electric current values not smaller than the second threshold value TH2, respectively; weight addition means 302-5 for assigning a first weighting coefficient W1 to the number of times Cα of the sampled electric current values larger than the first threshold value TH1, assigning a second weighting coefficient W2 smaller than the first weighting coefficient W1 to the number of times Cβ of the sampled electric current values smaller than the first threshold value TH1 and not smaller than the second threshold value TH2 and adding up the number of times that the weight assignment is performed; abnormality determination means 302-6 for determining passage of an abnormal electric current through the electric wire 200 when the number of counts Cγ in a certain period of time is not smaller than a first number of times CT1' and determining passage of an abnormal electric current through the electric wire 200 when the number of counts Cγ in the certain detection period is smaller than the first number of times CT1' and except for zero and when a number of counts Cγ in a period of time following the certain period of time in terms of time is larger than a second number of times CT2'; and control means 302-4 or 55 for interrupting an electric current which passes through the electric wire 200 by switching off a switch 54 provided on the electric wire 200 for establishing the connection between the power source portion 52 and the load 53 when passage of an abnormal electric current has been detected by the abnormality determination means 302-6.

The structure is arranged as described above. If pulse-shape electric currents caused from an intermittent short circuit pass through the electric wire 200, the sampling means 302-1 samples the values of the pulse-shape electric currents. Then, the sampled electric current values are, by the comparison means 302-2, sectioned into those not smaller than the first threshold value TH1 and those between the second threshold value TH2 and the first threshold value TH1. Then, the first and second counters 304-1 and 304-2 individually count the numbers of times Cα and Cβ in the corresponding periods of time.

The number of counts Cα not smaller than the first threshold value TH1 is a value which causes the damage of the electric wire 200 as compared with the number of counts Cβ between the second threshold value TH2 and the first threshold value TH1. Therefore, the weight addition means 302-5 assigns a heavier weight to the number of counts Cα as compared with the weight which is assigned to the number of counts Cβ. Then, the numbers of times that the weight assignment is performed are added up. If the number of times Cγ that the weight assignment is performed is larger than the first number of times CT1', the abnormality determination means 302-6 determines that an abnormal electric current which will damage the electric wire 200 is passing. Thus, the control means 302-4 or 55 interrupts an electric current which is supplied to the electric wire 200.

If the number of times Cγ that the weight assignment is performed is the number of times except for zero and smaller than the first number of times CT1', whether the detected number of times Cγ that the weight assignment is performed is caused from an abnormal electric current or noise cannot be determined. Therefore, the abnormality determination means 302-6 again performs the abnormality determination in accordance with the number of times Cγ that the weight assignment is performed to determine whether or not the number of times Cγ that the weight assignment is performed is larger than the second number of times CT2'. If the number of times Cγ that the weight assignment is performed is larger than the second number of times CT2', the abnormality determination means 302-6 determines that an abnormal electric current is passing through the electric wire 200. At this time, the control means 302-4 or 55 interrupts an electric current which is supplied to the electric wire 200.

As compared with the power supply apparatus according to the thirteenth aspect of the invention, the passage of an abnormal electric current is determined in accordance with the number of times Cγ obtained by weighting and adding in accordance with the sampled electric current value. In accordance with a result of the determination, whether or not an electric current is supplied to the electric wire 200 is determined. Therefore, an abnormal electric current which will damage the electric wire can furthermore be detected. As a result, safety and reliability during the supply of electric power can furthermore be improved.

A power supply apparatus for a vehicle according to the fifteenth aspect of the invention maybe incorporated in a structure according to the thirteenth or fourteenth aspect, and requires that the switch 54 is not switched off by the control means 302-4 or 55 until a predetermined period of time elapses from the moment in time at which supply of electric power to the load 53 has been started.

In the above-mentioned structure, a rush current having a current value larger than that of a rated current passes through each load 53 in, for example, a lamp system or a motor, until the temperatures of the loads 53 are raised to a certain temperature level for a certain period of time from start of supply of electric power to the loads 53. Therefore, detection of an abnormal electric current is not performed in the above-mentioned period of time. As a result, incorrect determination that the rush current, which is substantially a normal electric current, is determined as an abnormal electric current can be prevented. Thus, a malfunction that supply of an electric current to the load 53 is interrupted when a rush current passes through the load 53 can be prevented.

A power supply apparatus for a vehicle according to the sixteenth aspect of the present invention maybe incorporated in a structure according to any one of the thirteenth to fifteenth aspects, and requires that the second number of times CT2 or CT2' is smaller than the first number of times CT1 or CT1'.

A power supply apparatus for a vehicle according to the seventeenth aspect of the present invention maybe incorporated in a structure according to any one of the thirteenth to sixteenth aspects, and requires that the first and second numbers of times CT1 or CT1' and CT2 or CT2' are determined in consideration of a damage characteristic of the electric wire 200.

BRIEF DESCRIPTION OF THE DRAWINGS

FIG. 12 is a graph showing the operation for detecting an abnormal electric current according to the second embodiment.

DETAILED DESCRIPTION OF PREFERRED EMBODIMENTS

Embodiments of the present invention will now be described with reference to the drawings.

Figure 1:
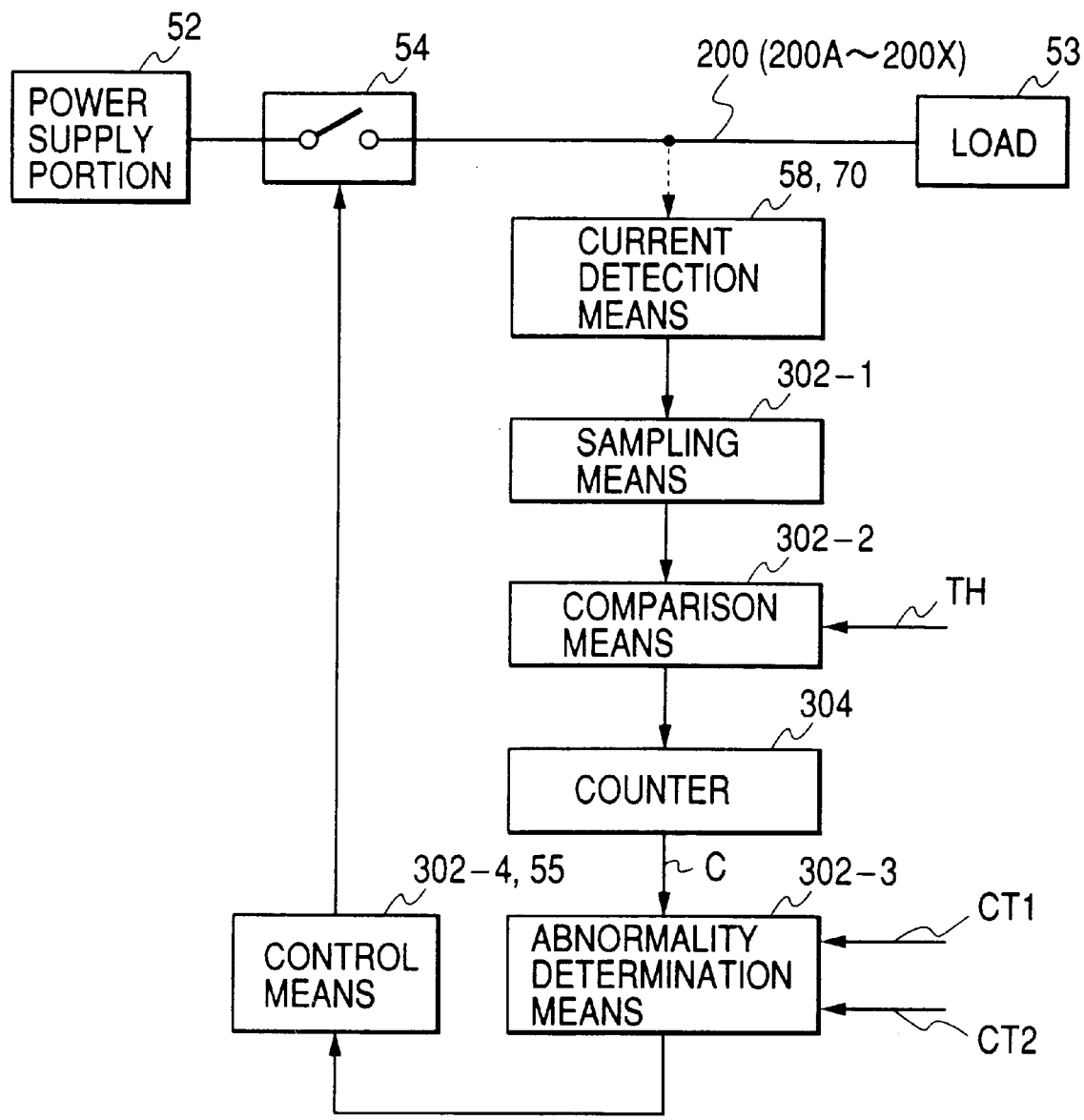
FIG. 1 is a block diagram showing a basic structure according to an embodiment of the present invention.
Figure 2:
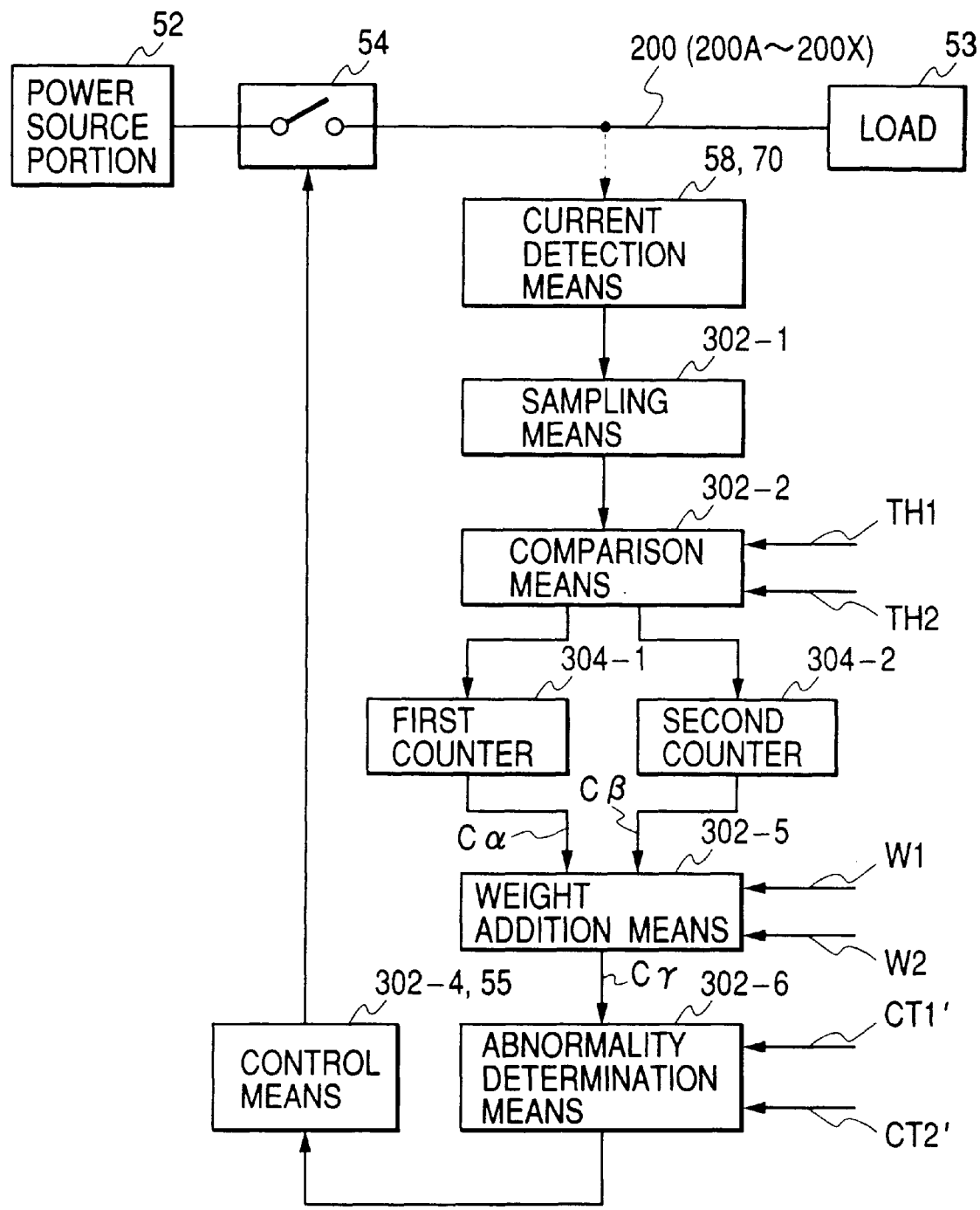
FIG. 2 is a block diagram showing a basic structure according to another embodiment of the present invention.
Figure 3:
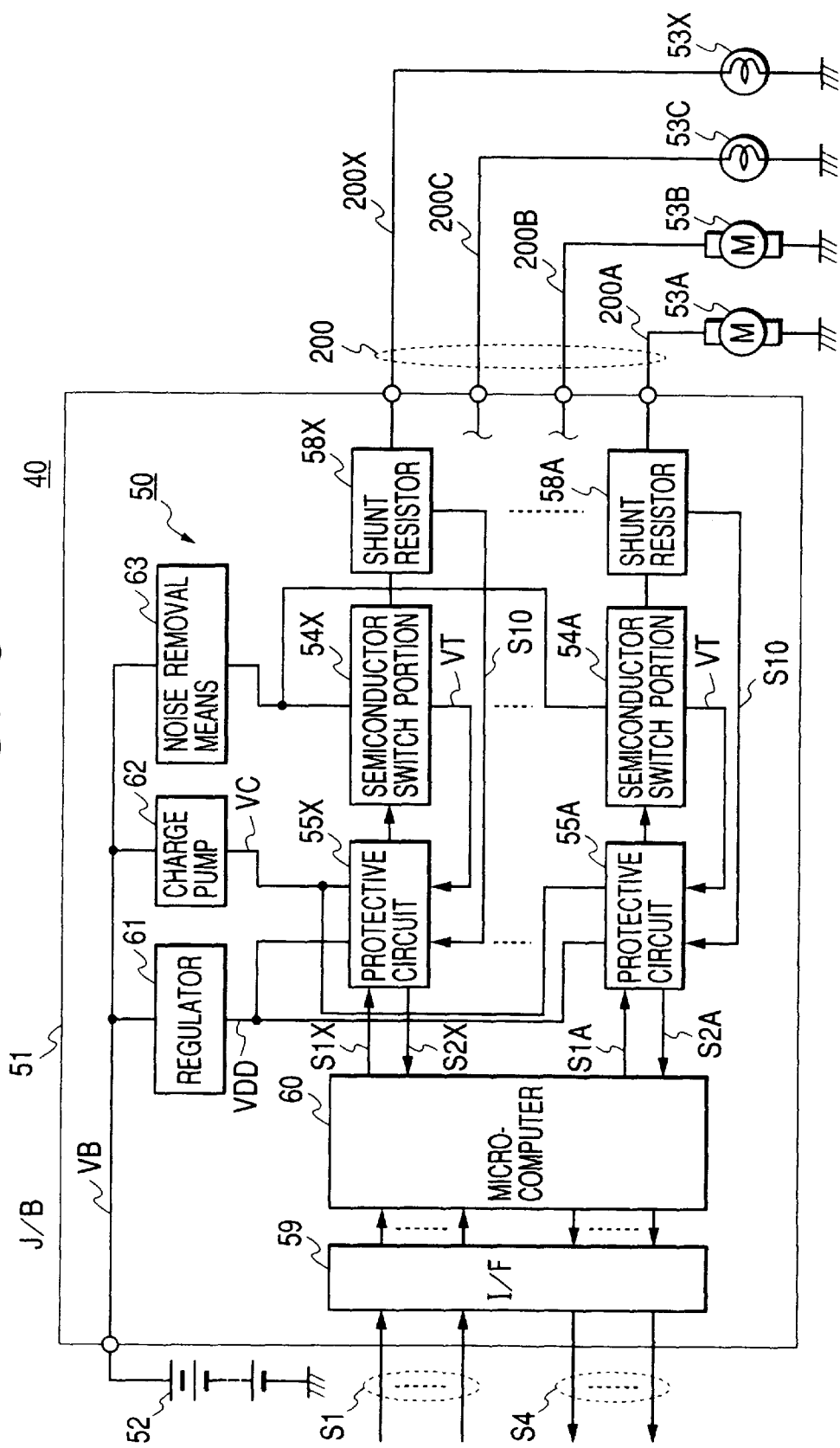
FIG. 3 is a diagram showing the connection and the schematic structure of the power supply apparatus for a vehicle according to an embodiment of the present invention.

(1) First Embodiment (1-1) Schematic Structure of Power Supply Apparatus for Vehicle Referring to FIG. 3, reference numeral 40 represents a schematic structure of a power supply apparatus for a vehicle according to the embodiment of the present invention. The apparatus is structured in such a manner that electric power is selectively supplied from a power supply portion 52 comprising a battery or an alternator to the loads 53A to 53X through a switching portion 50 disposed in the junction box (J/B) 51. The junction box 51 and the loads 53A to 53X are electrically connected to each other through electric wires 200A to 200X. Thus, electric power is supplied to each of the loads 53A to 53X through the electric wires 200A to 200X. Note the electric wires 200A to 200X are tied in a bundle so that a harness 200 is formed.

The switching portion 50 has a plurality of semiconductor switch portions 54A to 54X each having a semiconductor switch and arranged to selectively supply electric power from the power supply portion 52 to the loads 53A to 53X in accordance with the on-off operation of the semiconductor switch. Moreover, the switching portion 50 has a plurality of protective circuits 55A to 55X disposed to correspond to the semiconductor switch portions 54A to 54X and arranged to control the operation of the semiconductor switches so as to protect the semiconductor switches from excess current and overheat. The semiconductor switch portion 54A, the protective circuits 55A, ..., the semiconductor switch portion 54X and the protective circuit 55X form a so-called intelligent power switch.

An interface (I/F) 59 of the switching portion 50 is supplied with switching control signal S1 (hereinafter called a "control signal S1") transmitted from operation switches (not shown) corresponding to the loads 53A, 53B, 53C, ..., 53X. The supplied control signal S1 is supplied to a microcomputer 60 through the interface 59.

The microcomputer 60 transmits, to the protective circuits 55A, 55B, 55C, ..., 55X, control signal S1 corresponding to the loads 53A, 53B, 53C, ..., 53X and supplied from the operation switches. For example, the protective circuit 55A, the semiconductor switch portion 54A and the shunt resistor 58A are disposed to correspond to the load 53A. Similarly, the protective circuit 55X, the semiconductor switch portion 54X and the shunt resistor 58X are disposed to correspond to the load 53X.

The relationship among the microcomputer 60, the protective circuit 55A, the semiconductor switch portion 54A, the shunt resistor 58A and the load 53A is the same as the relationship among the microcomputer 60, protective circuits 55B to 55X, the semiconductor switch portions 54B to 54X, shunt resistors 58B to 58X and the loads 53B to 53X. Therefore, only the relationship among the microcomputer 60, the protective circuit 55A, the semiconductor switch portion 54A, the shunt resistor 58A and the load 53A will now be described.

The on-off operation of the semiconductor switch in the semiconductor switch portion 54A is controlled in accordance with the operation voltage supplied from the protective circuit 55A. When the semiconductor switch is switched on, electric power VB supplied through a noise removal circuit 63 is as it is transmitted. Electric power VB supplied through the semiconductor switch portion 54A is supplied to the load 53A through the shunt resistor 58A.

In this embodiment, electric power VB is 12 [V]. The shunt resistor 58A has a resistance value of, for example, about 10 [m$\Omega$] and a permissible resistance value of about ±5 [%]. When a one-chip form diffused resistor or a polysilicon resistor is employed, an accurate detection of an electric current can be performed.

The protective circuit 55A is supplied with stabilized source voltage VDD from a regulator 61 and supplied with operating voltage VC, the level of which has been raised by a charge pump 62. In response to a control signal S1A transmitted from the microcomputer 60, the operating voltage VC is selectively applied to the gate of the semiconductor switch in the semiconductor switch portion 54A so that the on-off operation of the corresponding semiconductor switch is controlled.

The protective circuit 55A is supplied with temperature information VT from a temperature detection circuit disposed in the semiconductor switch portion 54A. Moreover, the protective circuit 55A is, from the shunt resistor 58A, supplied with current-value information SI0 indicating the level of an electric current which passes from the semiconductor switch. Thus, the protective circuit 55A detects whether or not the semiconductor switch is in an overheat state and whether or not an excess current is passing through the semiconductor switch.

If the semiconductor switch is in an overheated state, or if an excess current passes through the semiconductor switch, the protective circuit 55A interrupts supply of the operating voltage VC to the gate of the semiconductor switch even in a case in which a control signal S1A indicating the semiconductor switch is on-controlled has been supplied from the microcomputer 60. Thus, the protective circuit 55A switches the semiconductor switch off so that the semiconductor switch is protected from overheating and an excess current.

Moreover, the protective circuit 55A supplies, to the microcomputer 60, current-value information SI0 obtained from the shunt resistor 58A as a detected-current signal S2A. In accordance with the detected-current signal S2A, the microcomputer 60 determines whether or not an abnormal electric current which will damage the harness 200 is passing through the electric wire 200A.

If passage of the abnormal electric current of the foregoing type is determined, the control signal S1A for forcibly off-controlling the semiconductor switch is transmitted to the protective circuit 55A. Moreover, an abnormality signal S4 is transmitted through the interface 59. Thus, an abnormality display portion (not shown), for example an indicator lamp, is turned on. As a result, the power supply apparatus 40 for a vehicle is able to protect the harness 200 from being damaged. The process arranged to be performed by the microcomputer 60 so as to detect an abnormal electric current will be described later.

(1-2) Detailed Structure of Switching Portion

Figure 4:
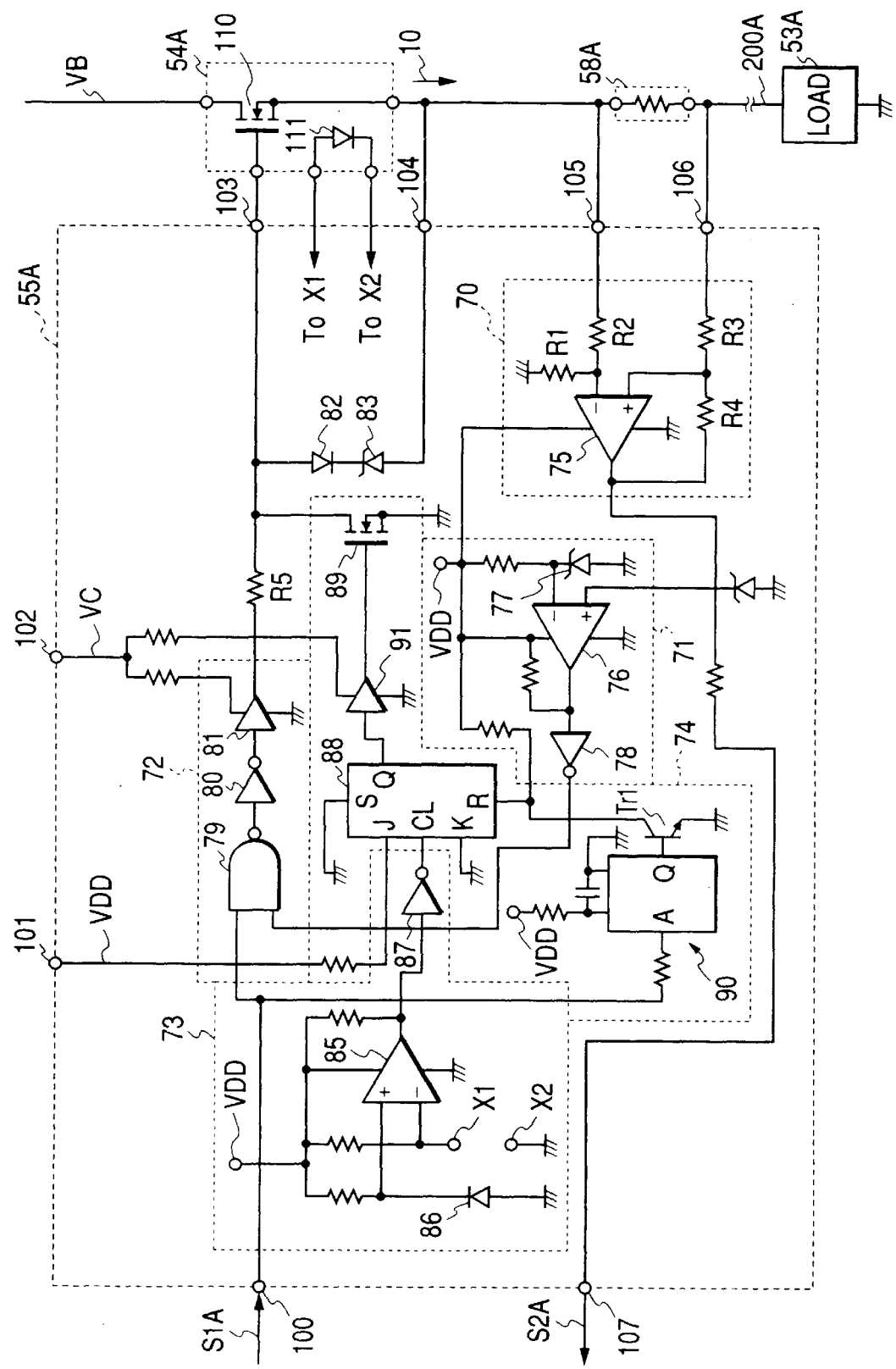
FIG. 4 is a circuit diagram showing the detailed structure of a switching portion.

Detailed structures of the semiconductor switch portions 54A to 54X and the protective circuits 55A to 55X forming the switching portion 50 will now be described with reference to FIG. 4. Referring to FIG. 3, the protective circuit 55A, the semiconductor switch portion 54A and the shunt resistor 58A corresponding to the load 53A will representatively be described among the plurality of the protective circuits 55A to 55X, the plurality of the semiconductor switch portions 54A to 54X, the plurality of the shunt resistors 58A to 58X and the plurality of the loads 53A to 53X shown in FIG. 3.

In this embodiment, the semiconductor switch portion 54A, the protective circuit 55A and the shunt resistor 58A are formed on individual semiconductor chips. The semiconductor chip for forming the semiconductor switch portion 54A has a power MOS FET 110 serving as the semiconductor switch and a temperature detection circuit 111 formed thereon.

The main components of the protective circuit 55A will now be described. A current detection circuit 70 detects the value (that is, the value of an electric current which is passing through the wire 200A) I0 of an excess current which is passing through the MOS FET 110 in accordance with the voltage across the shunt resistor 58A. An excess-current detection circuit 71 subjects the voltage value corresponding to the electric current detected by the current detection circuit 70 and a reference voltage corresponding to the rated current for the MOS FET 110 to a comparison so as to detect whether or not an electric current which will damage the MOS FET 110 is passing through the MOS FET 110. A logical product circuit 72 selectively supplies the operating voltage to the gate of the MOS FET 110 in accordance with the logical product of a result of the detection performed by the excess-current detection circuit 71 and the control signal S1A. An overheat detection circuit 73 subjects detected voltage (corresponding to temperature information VT described with reference to FIG. 3) corresponding to the temperature of the MOS FET 110 communicated from the temperature detection circuit 111 and reference voltage to a comparison so as to detect whether or not the MOS FET 110 has been heated to a level at which the MOS FET 110 is broken with heat. An overheat protective circuit 74 forcibly lowers the gate voltage of the MOS FET 110 so as to turns the MOS FET 110 off if the result of the detection performed by the overheat detection circuit 73 indicates overheating.

The current detection circuit 70 detects current value I0 which is passing through the shunt resistor 58A in accordance with the voltage across the shunt resistor 58A. That is, the current detection circuit 70 applies the voltage at an end of the shunt resistor 58A to a non-inverted input terminal of a difference amplifying circuit 75 through an input terminal 105 and divided resistors R1 and R2. Moreover, the current detection circuit 70 applies the voltage at another end of the shunt resistor 58A to an inverted terminal of the difference amplifying circuit 75 through an input terminal 106 and an input resistor R3. In addition, the current detection circuit 70 establishes the connection between the inverted input terminal and the output terminal of the difference amplifying circuit 75 to each other through a resistor R4. Thus, an output of a voltage value corresponding to the output electric current value I0 can be produced. The voltage (that is, detected-current signal S2A) detected by the current detection circuit 70 is communicated to the microcomputer 60 through an output terminal 107.

The excess-current detection circuit 71 supplies, to the non-inverted input terminal of the comparator 76, the detected voltage value communicated from the current detection circuit 70. Moreover, the excess-current detection circuit 71 supplies, to the inverted input terminal of the comparator 76, the reference voltage value corresponding to the rated electric current of the MOS FET 110 generated by the reference-voltage generator 77. If the detected voltage value is not lower than the reference voltage value, an output made when the detected voltage value is made to be not lower than the reference voltage value as a positive potential (hereinafter called a "positive logic", while zero potential is called a "negative logic"). Then, the output of the comparator 76 is supplied to the logical product circuit 72 through an inverter 78. Thus. the excess-current detection circuit 71 produces an output of the positive logic if a normal electric current passes through the MOS FET 110. If an excess current which will damage the MOS FET 110 passes through the MOS FET 110, the excess-current detection circuit 71 produces an output of the negative logic.

The logical product circuit 72 supplies, to a NAND circuit 79 through a control-signal input terminal 100, the control signal S1A. Moreover, the logical product circuit 72 supplies a logical value communicated from the excess-current detection circuit 71 so that a result of the NAND is obtained. An output of the NAND circuit 79 is supplied to a buffer 81 through an inverter 80. Then, an output of the buffer 81 is supplied to the gate of the MOS FET 110 through a resistor R5.

When, for example, the control signal S1A is positive logic (in this embodiment, the positive logic is set to be about 5 [V] and the negative logic is set to be 0 [V]) and the output of the excess-current detection circuit 71 is the positive logic (indicating that the electric current is not an excess current), the logical product circuit 72 causes the inverter 80 to transmit a positive logic signal. When the control signal S1A is the positive logic and the output of the excess-current detection circuit 71 is the negative logic, a negative logic signal is transmitted from the inverter 80.

As described above, the logical product circuit 72 transmits a negative logic signal when a logical value indicating passage of an excess current through the MOS FET 110 is obtained by the excess-current detection circuit 71 or when the control signal S1A is the signal for switching the MOS FET 110 off.

The buffer 81 is, through a terminal 102, supplied with the operating voltage VC generated by the charge pump 62. As a result, the voltage value required to switch the MOS FET 110 on is maintained at the gate of the MOS FET 110. In this case, the positive logic output of 5 [V] of the inverter 80 is shifted by 12 [V] by the buffer 81. Then, the buffer 81 produces an output of 17 [V].

Therefore, the output of the inverter is the positive logic, voltage of 17 [V] is applied to the gate of the MOS FET 110. Thus, the MOS FET 110 is normally turned on. If the output of the inverter is the negative logic, the output of the buffer 81 is made to be the ground potential. As a result, any potential difference cannot be obtained between the gate and the source, causing the MOS FET 110 to be turned off. A diode 82 and a Zener diode 83 are connected between the gate and the source of the MOS FET 110. If an excess voltage is applied to the gate, the excess current can be bypassed and thus the MOS FET 110 can be protected from being damaged.

In the overheat detection circuit 73, the temperature detection circuit 111 of the semiconductor switch portion 54A is connected to the inverted input terminal of the comparator 85. Moreover, the reference-voltage generator 86 is connected to the non-inverted input terminal of the comparator 85.

In the overheat detection circuit 73, the potential of the inverted input terminal of the comparator 85 is lowered because the resistance value of the diode forming the temperature detection circuit 111 is reduced as the temperature of the MOS FET 110 is raised. When the potential of the inverted input terminal has been made to be lower than the reference potential, the comparator 85 produces an output of the positive logic. An assumption is made that an output of the positive logic is produced when the temperature of the MOS FET 110 is not lower than 150 [° C.]. The logical output of the comparator 85 is transmitted to the overheat protective circuit 74 through the inverter 87.

The overheat protective circuit 74 comprises a JK flip flop 88 structured to be operated in accordance with the logical value obtained from the overheat detection circuit 73 and in response to the control signal S1A. Moreover, the overheat protective circuit 74 comprises a MOS FET 89 which is turned on or off in accordance with the output of the JK flip flop 88 to change the gate voltage of the MOS FET 110 so as to control the on-off operation of the MOS FET 110.

If the capacities of the MOS FET 110 and the MOS FET 89 are subjected to a comparison, the rated electric current of the MOS FET 110 is set to be about 10 [A] and the rated electric current of the MOS FET 89 is set to be about 10 [mA]. Also the areas of the circuits are made in such a manner that the area of the MOS FET 89 is about "$1/1000$" of the MOS FET 110 when an assumption is made that the area of the MOS FET 110 is "1".

The overheat protective circuit 74 will specifically be described below. The logical output of the overheat detection circuit 73 is supplied to a clock input CL of the JK flip flop 88. Moreover, the collector of a transistor Tr1 is connected to a reset input R. The control signal S1A is, through a one-shot multi-vibrator 90, supplied to the base of the transistor Tr1. When the control signal S1A has been converted from the negative logic to the positive logic, the output pulse of the one-shot multi-vibrator 90 is raised. Thus, an electric current passes from the collector of the transistor Tr1 to the emitter of the same. As a result, the potential of the reset input R is lowered, thus causing the JK flip flop 88 to be reset. The source voltage VDD stabilized by the regulator 61 is supplied to input J of the JK flip flop 88. Moreover, the input K and the set input S are grounded.

The operation of the JK flip flop 88 will now be described with reference to FIG. 5. When the control signal S1A is made to be the positive logic at time t1 (see FIG. 5 (A)), the output pulse of the one-shot multi-vibrator 90 rises. Thus, the base potential of the transistor Tr1 is raised, causing the reset pulse (see FIG. 5 (C)) having a pulse width corresponding to the output pulse to be supplied to the reset input R. As a result, the JK flip flop 88 is brought to a reset state.

Figure 5:
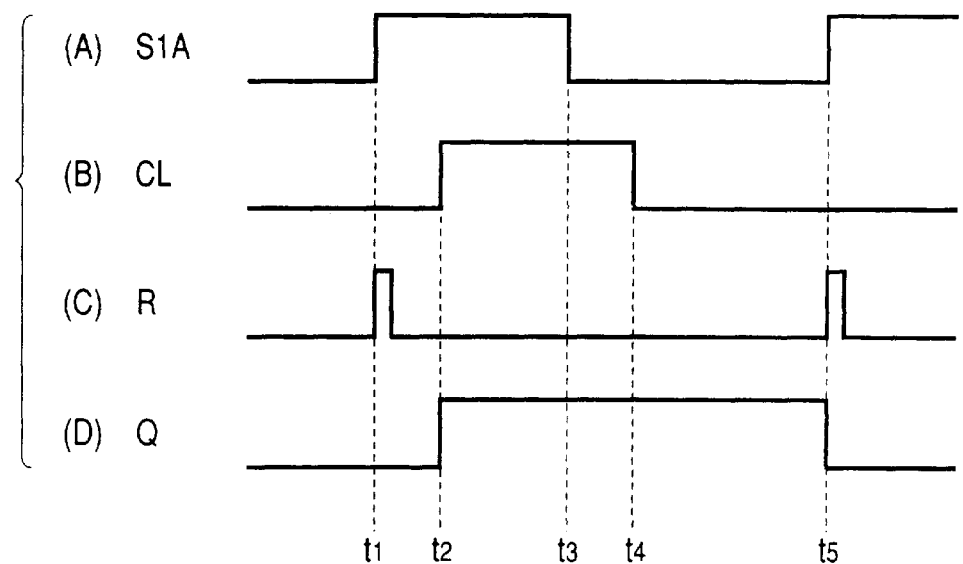
FIG. 5 is a timing chart of the operation of the JK flip flop shown in FIG. 4.

When the temperature of the MOS FET 110 is made to be not lower than a predetermined level at time t2 in the above-mentioned state, the logical output which is supplied from the overheat detection circuit 73 to the clock input CL is made to be positive logic (see FIG. 5 (B)). As a result, output Q is made to be the positive logic. Even if the control signal S1A is made to be the negative logic at time t3 or even if the logical output which is, at time t4, supplied from the overheat detection circuit 73 to the clock input CL is made to be negative logic, the JK flip flop 88 maintains the above-mentioned state so that the JK flip flop 88 continuously transmits the positive logic as the output Q. When the control signal S1A is again changed from the negative logic to the positive logic at time t5 and the reset pulse is supplied to the reset input R, the output Q is inverted from the positive logic to the negative logic (see FIG. 5 (D)).

As described above, the JK flip flop 88 produces the positive logic output Q only when the output of the overheat detection circuit 73 has been made to be the positive logic in the state where the control signal S1A is the positive logic. Even if the output of the overheat detection circuit 73 is subsequently made to be the negative logic, the JK flip flop 88 maintains the above-mentioned state. Description will be made about the reason why the overheat protective circuit 74 has a latch structure and the MOS FET 110 is continuously turned off until the control signal S1A reaches to turn the MOS FET 110 is on if the temperature of the MOS FET 110 is once raised to be not lower than the predetermined level.

If the overheat protective circuit 74 is not formed into the latch structure and whether the MOS FET 110 is turned on or off is controlled in real time in accordance with a result of detection of the temperature, off-control of the MOS FET 110 which is performed because the temperature of the MOS FET 110 has been raised to be not lower than a predetermined level causes the temperature of the MOS FET 110 to rapidly be lowered. Thus, the MOS FET 110 is on-controlled. If the temperature of the MOS FET 110 is again raised, the MOS FET 110 is off-controlled. If the above-mentioned on-off operations are frequently repeated in a short time, instable electric power is supplied to the load 53A. Therefore, the MOS FET 110 is restored to the on state only when the control signal S1A which has once been made to be negative logic is again made to be the positive logic.

The output Q of the JK flip flop 88 is supplied to the gate of the MOS FET 89 through a buffer 91 structured similarly to the buffer 81 which is supplied with the output of the charge pump 62 and which shifts the level of the input by 12 [V]. As a result, voltage of 17 [V] is applied to the gate of the MOS FET 89 if the output Q is the positive logic (5 [V]). Therefore, the MOS FET 89 is brought to the on-state. If output Q is the negative logic (0 [V]), the MOS FET 89 is brought to the off-state because the gate of the MOS FET 89 is applied with only the ground potential.

When the MOS FET 89 has been brought to the on-state, the gate of the MOS FET 110 is made to be the ground potential. As a result, the MOS FET 110 is forcibly turned off regardless of the logical output of the logical product circuit 72. If the MOS FET 89 has been brought to the off-state, the gate potential of the MOS FET 110 is made to be a value corresponding to the logical output of the logical product circuit 72.

In the overheat detection circuit 73 and the overheat protective circuit 74, the MOS FET 110 can forcibly be turned off in a period of time in which at least the temperature of the MOS FET 110 is not lower than the predetermined level. As a result, damage caused from overheating of the MOS FET 110 can be prevented.

Figure 6:
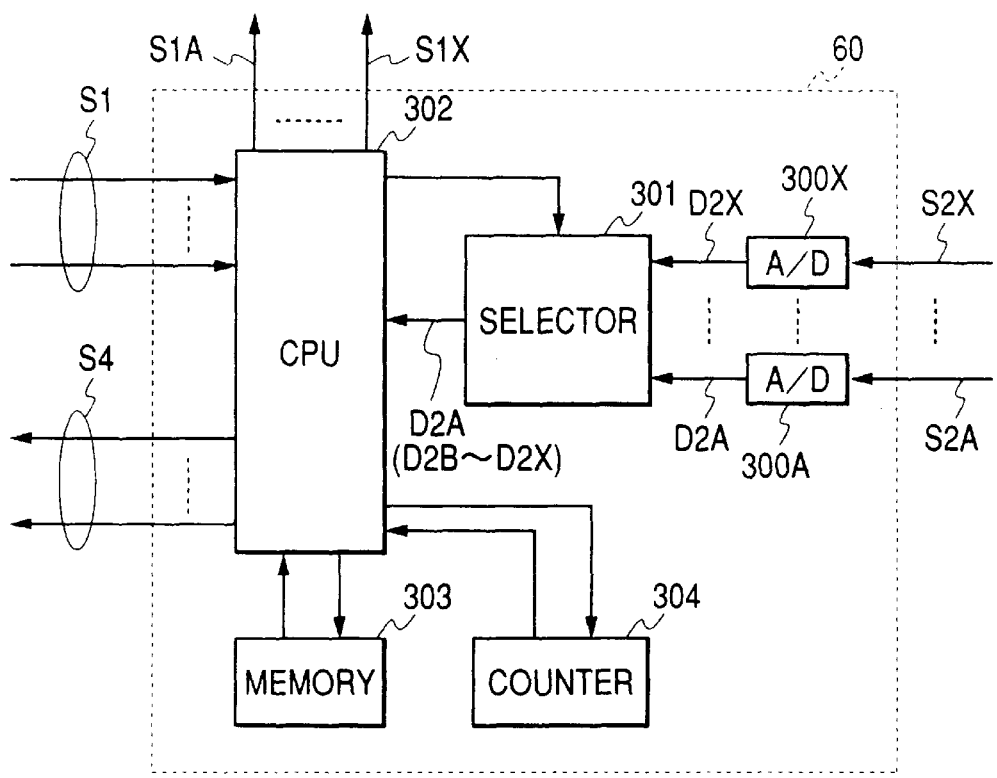
FIG. 6 is a block diagram showing the structure of the microcomputer shown in FIG. 3.

(1-3) Structure of Microcomputer and Process for Detecting Abnormal Electric Current The microcomputer 60 has a structure as shown in FIG. 6. to cause analog-to-digital conversion circuit (A/D) 300A to 300X to convert current detection signals S2A to S2X of the electric wires 200A to 200X transmitted from the output terminal 107 of the protective circuits 55A to 55X into digital signals, and then transmit the digital signals to a selector 301.

The selector 301 transmits, to the CPU 302, any one detected-current data item among plurality of detected-current data D2A to D2X supplied thereto in accordance with an instruction from the CPU (Central Processing Unit) 302. The CPU 302 determines whether or not an abnormal electric current which will damage the electric wires 200A to 200X is passing through the electric wire in accordance with supplied detected-current data.

Figure 7:
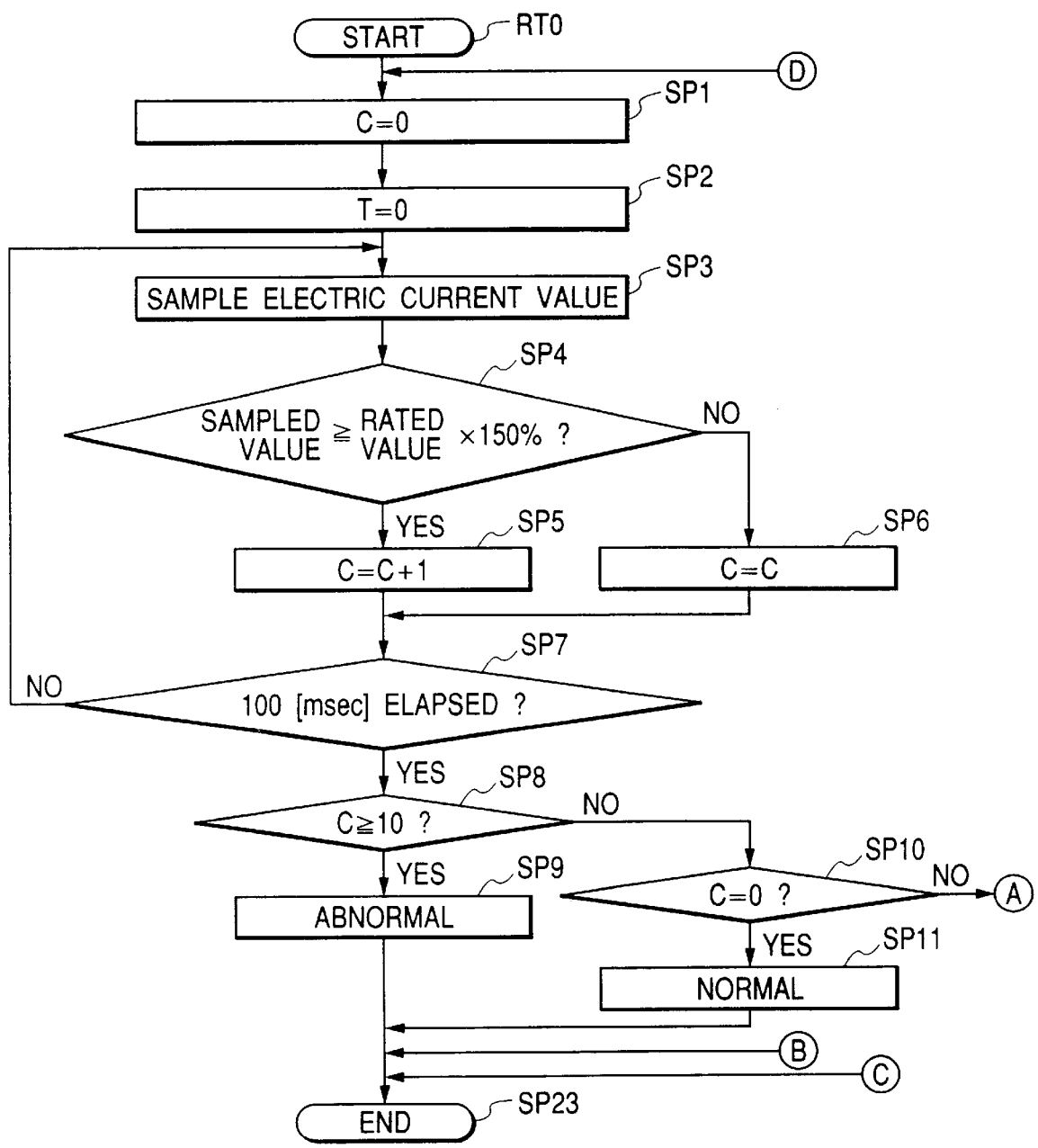
FIG. 7 is a flow chart of the process of a microcomputer for detecting an abnormal electric current according to a first embodiment of the present invention.
Figure 8:
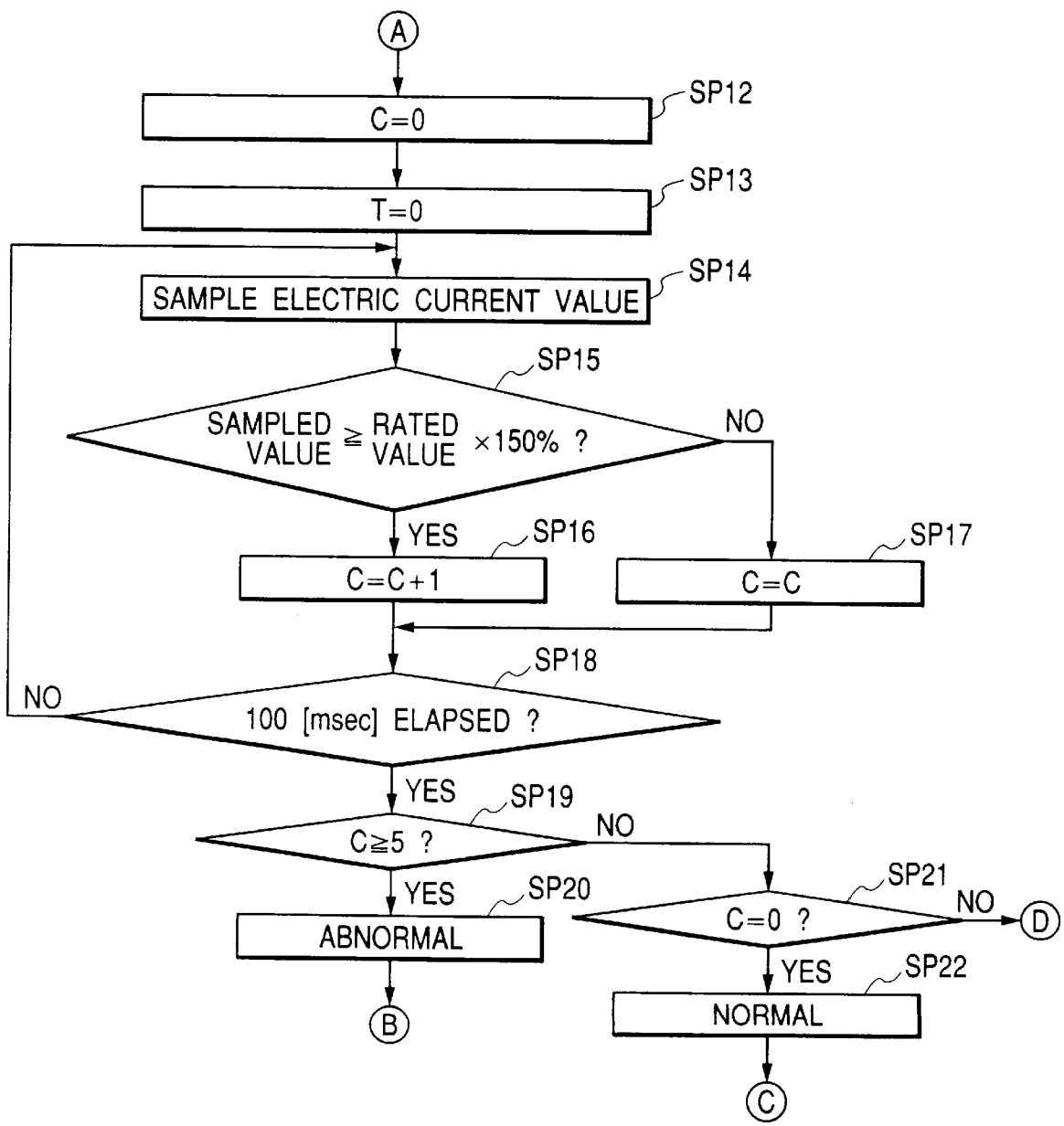
FIG. 8 is a flow chart of the process of the microcomputer for detecting an abnormal electric current according to the first embodiment.

At this time, the CPU 302 performs a process shown in FIGS. 7 and 8. In step SP1, the CPU 302 initially resets the number of counts C of the counter 304. In step SP2, the CPU 302 resets the internal timer to realize an initial state.

Then, the CPU 302 samples supplied detected-current data D2A, D2B, . . . , or D2X (in this case, description will be made about a case in which detected-current data D2X has been supplied) at predetermined sampling intervals. In this embodiment, sampling is performed at intervals of 5 [msec]. In step SP4 whether or not the sampled values of the electric currents are not lower than 150% of the rated electric current (for example, 10 [A]) is determined. If the electric current values are not lower than 150%, the operation proceeds to step SP5. If the electric current values are lower than 150%, the operation proceeds to step SP6.

If the operation proceeds to step SP5, the number of counts C of the counter 304 is increased. If the operation proceeds to step SP6, the number of counts C of the counter 304 is maintained. In step SP7 whether or not time T of the internal time has reached 100 [msec] is determined. If time T does not reach 100 [msec], the operation returns to step SP3 so that the processes in steps SP3 to SP6 are again performed. If time T of the internal timer reaches 100 [msec], the operation proceeds to step SP8.

In step SP8 whether or not the number of counts C of the counter 304 is not smaller than 10 is determined. The foregoing operation corresponds to determination of a threshold value for the number of times that excess currents have been generated in the detection period of time of 100 [msec]. Since the CPU 302 samples the electric current values at the intervals of 5 [msec], 20 times of the operations for determining the excess currents are performed in the unit detection period of 100 [msec]. If the number of counts C is not smaller than 10, the foregoing state means a fact that an abnormal electric current which will damage the wire 200A is passing through the wire 200A. At this time, the operation is shifted to step SP9 so that determination of abnormality is performed. The control signal S1A is transmitted to the protective circuit 55A to turn the MOS FET 110 of the semiconductor switch portion 54A off. Thus, an electric current for the wire 200A is interrupted.

At this time, the CPU 302 transmits abnormality signal S4 to a display portion for displaying passage of an abnormal electric current. Thus, passage of the abnormal electric current through the wire 200A is displayed. After the process in step SP9 has been completed, the operation of the CPU 302 proceeds to step SP23 so that routine RT0 of a process for detecting an abnormal electric current in the wire 200A is completed.

If a negative result is obtained in step SP8, the operation of the CPU 302 is shifted to step SP10 to determine whether or not the number of counts C is zero. If the number of counts C is zero, the operation proceeds to step SP11 so that no passage of an abnormal electric current is determined. Then, the operation proceeds to step SP23 so that the routine RT0 of a process for detecting an abnormal electric current in the wire 200A is completed.

If a negative result is obtained in step SP10, that is, if number of counts C is 1 to 9, the CPU 302 determines that an abnormal electric current is passing through the wire 200A or noise is undesirably detected. Therefore, the CPU 302 is shifted to step SP12 to perform a process for detecting an abnormal electric current in a next detection period.

The CPU 302 initially resets the number of counts C of the counter 304 in step SP12. In step SP13 the CPU 302 resets the internal timer so that an initial state is realized. In step SP14 the CPU 302 samples detected-current data D2A. In step SP15 whether or not the sampled values of the electric currents are not lower than 150% of the rated electric current is determined. If the sampled values are not lower than 150%, the CPU 302 increases the number of counts C in step SP16. If the sampled values are lower than 150%, the CPU 302 maintains the number of counts C in step SP17.

The processes in steps SP14 to SP17 are performed until an affirmative result is obtained in step SP18. If an affirmative result is obtained, the operation proceeds to step SP19. In step SP19 whether or not the number of counts C is not smaller than 5 is determined. If the value is not smaller than 5, the operation is shifted to step SP20 so that a determination of passage of an abnormal electric current through the wire 200A is made similarly to the process in step SP9. Moreover, an electric current for the wire 200A is interrupted and abnormality is displayed on the display portion.

If a negative result is obtained in step SP19, the operation is shifted to step SP21 so that whether or not the number of counts C is zero is determined. If the number of counts C is zero, the operation is shifted to step S22 so that a determination is made that no abnormal electric current is passing through the electric wire. Then, the operation proceeds to step SP23 so that the routine RT0 of a process for detecting an abnormal electric current is completed If a negative result is obtained in step SP21, that is, if the number of counts C is 1 to 4, the CPU 302 cannot determine whether an abnormal electric current is passing through the wire 200A or noise is undesirably detected. At this time, the CPU 302 returns to step SP1 so that the CPU 302 again performs the process for detecting an abnormal electric current in a next detection step.

The threshold value (10 or 5) for the number of counts C for use in step SP8 or step SP19 is stored in a memory 303. The CPU 302 reads the threshold value from the memory 303 as the need arises.

After the CPU 302 has completed the routine RT0 of the process for detecting an abnormal electric current in the wire 200A in accordance with detected-current data D2A, the CPU 302 sequentially subjects the other electric wires 200B to 200X to the routine RT0 of the process for detecting an abnormal electric current. Thus, the CPU 302 detects whether or not an abnormal electric current is passing through each of the electric wires 200B to 200X. If the CPU 302 determines passage of an abnormal electric current, the CPU 302 interrupts an electric current for the electric wire and causes the abnormality to be displayed. As a result, damage of each of the electric wires 200A to 200X can be prevented.

The CPU 302 does not subject electric wires of a type corresponding to a load, such as a lamp or a motor, through which a rush current passes when supply of electric power is started to the routine RT0 of the process for detecting an abnormal electric current until a predetermined period of time elapses from start of electric power. As a result, incorrect detection that the rush current is detected as an abnormal electric current can be prevented.

(1-4) Operation and Effect

The power supply apparatus 40 for a vehicle is structured in such a manner that a fuse corresponding to the damage characteristic of each of the electric wires 200A to 200X is not provided. As an alternative to this, values of electric currents which pass through the electric wires 200A to 200X are supplied to the microcomputer 60. Thus, the microcomputer 60 performs the routine RT0 of the process for detecting an abnormal electric current so that an abnormal electric current is detected. If an abnormal electric current is detected, a semiconductor switch corresponding to each of the electric wires 200A to 200X is switched off so that the electric wires 200A to 200X are protected from being damaged.

Figure 9:
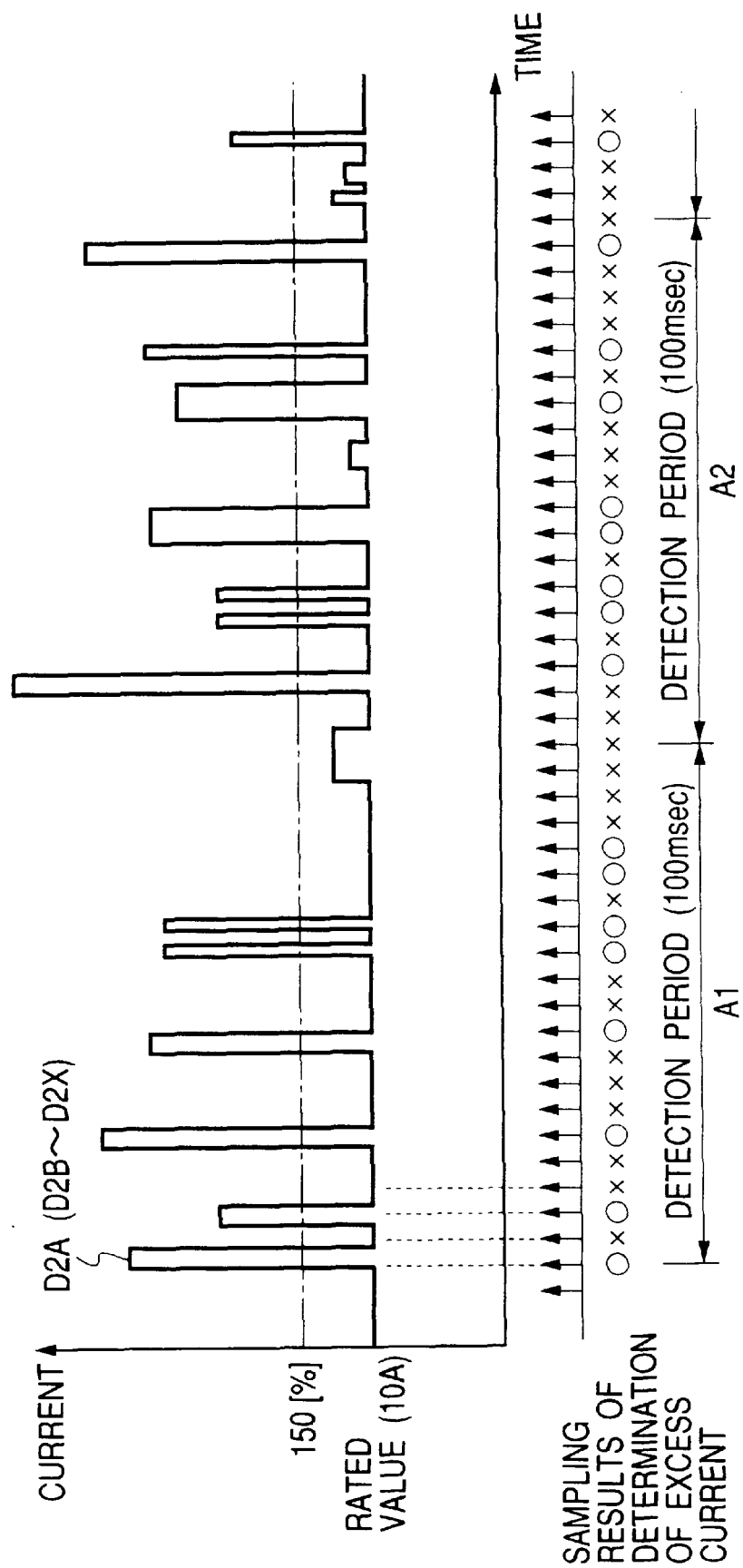
FIG. 9 is a graph showing the operation of the process for detecting an abnormal electric current according to the first embodiment.

Referring to FIG. 9, the operation for detecting an abnormal electric current according to this embodiment will now be described. The power supply apparatus 40 for a vehicle detects an abnormal electric current by sampling values of electric currents at predetermined sampling intervals (for example, 5 [msec]). Moreover, the power supply apparatus 40 for a vehicle performs threshold-value determination by using a threshold value (for example, a rated value×150%) which is larger than the rated electric current. The number of times of the values of the sampled electric currents made to be not smaller than the threshold value in a unit detection period (for example, 100 [msec]) are counted. If the number of counts is not smaller than the predetermined value, a determination of passage of an abnormal electric current through the electric wire is made. Thus, an electric current which is supplied to the electric wire is interrupted.

As a result, even if passage of pulse-shape electric currents takes place as in the case of an intermittent short circuit as well as the case in which excess currents pass continuously as in the case of a dead short circuit, the passage can be made to reflect the number of counts. Therefore, an electric current which is passing even in a case of a intermittent short circuit can be detected as an abnormal electric current in accordance with the number of counts. As a result, the power supply apparatus 40 for a vehicle is able to protect the electric wire from damage which cannot be prevented by the fuse and which is caused from an intermittent short circuit.

FIG. 9 is a graph showing passage of an abnormal electric current caused from an intermittent short circuit through an electric wire which is a subject of determination of an abnormal electric current. The CPU 302 performs the process for sampling the electric current values in step SP3 (see FIG. 7) in such a manner as to sample detected-current data D2A or detected-current data D2B to D2X at time indicated with an arrow in FIG. 7 at intervals of 5 [msec]. Then, the sampled electric current values are subjected to the excess current determination process in step SP4 so as to determine whether or not the electric current is an excess current.

Single circles indicate sampled electric currents determined as excess currents. In step SP5 the number of the single circles is counted. In step SP8 whether or not the number of the single circles is not smaller than ten is determined. If the number is not smaller than ten, passage of an abnormal electric current is determined. Since the number of the single circles is eight in the detection period A1, the process for detecting an abnormal electric current is again performed in a next detection period A2.

In this case, the number of the single circle is eight in the detection period A2. Since the number is not smaller than five, passage of an abnormal electric current is determined.

If the number of counts in the detection period A1 is not smaller than a first number of times (for example, 10), the power supply apparatus 40 for a vehicle immediately determines passage of an abnormal electric current through the electric wire and interrupts the electric current. If the number of counts is zero, a determination is made that no abnormal electric current is passing through the electric wire.

If the number of counts in the detection period A1 is smaller than the first number of times and except for zero, the power supply apparatus 40 for a vehicle is arranged to sample the electric current values at predetermined sampling intervals in detection period A2 following the detection period A1 in terms of time. Moreover, threshold value determination of each of the sampled electric current value is performed by using a threshold value larger than the rated electric current. The number of sampled electric current values not smaller than the threshold value in the detection period A2 is counted. If the number of times is not smaller than a second number of times (for example, five) which is smaller than the first number of times, passage of an abnormal electric current is determined and supply of an electric current to the electric wire is interrupted.

If the number of counts is smaller than the first number of times and except for zero in the first detection period A1, the number of counts detected in the foregoing detection period is a delicate value with which a determination is performed whether or not the number of counts is caused from an abnormal electric current or noise. Therefore, the process for detecting an abnormal electric current is again performed in the next detection period A2. As a result, incorrect detection caused from noise can be prevented and only the abnormal electric current can correctly be detected.

The reason why second number of times (five) which is the threshold value of the number of times of the count detected in the later detection period A2 in terms of time is made to be smaller than the first number of times (ten) which is the threshold value of the number of times of the count detected previously in terms of time will now be described. Since one or more sampled excess currents have been detected in the former detection period in terms of time, a large threshold value of the number of times similar to that in the previous detection period A1 is not required in the latter detection period A2 in terms of time. Since sampled excess currents have been detected in the successive detection periods A1 and A2, a determination of passage of an abnormal electric current may be made.

As a result of the above-mentioned structure, all of abnormal electric currents which include an abnormal electric current caused from the intermittent short circuit and which will damage the electric wire can be detected. Therefore, there can be provided the method of detected an abnormal electric current in a vehicle and an apparatus for detecting an abnormal electric current in a vehicle which are capable of accurately detecting passage of an abnormal electric current which will damage the electric wire for establishing the connection between the electric wire portion and the load and the power supply apparatus for a vehicle capable of preventing damage of an electric wire caused from the abnormal electric current.

(2) Second Embodiment

A second embodiment of the present invention will now be described with reference to FIGS. 10 to 12. The power supply apparatus for a vehicle according to this embodiment has a structure similar to the power supply apparatus 40 for a vehicle according to the first embodiment except for the process for detecting an abnormal electric current which is performed by the microcomputer 60.

The microcomputer 60 performs an electric-current sampling step for detecting values of electric currents which pass through the electric wire at predetermined sampling intervals; a first abnormal-electric-current determination step for assigning a first weighting coefficient to the number of times that a sampled electric current having a value larger than a first threshold value is detected in a unit detection period, assigning a second weighting coefficient smaller than the first weighting coefficient to the number of times that a sampled electric current having a value smaller than the first threshold value and not smaller than the second threshold value is detected and adding up the numbers of times that weight assignment is performed so as to determine that an abnormal electric current is passing through the electric wire when the added numbers of times that the weight assignment is performed are larger than a first number of times; and a second abnormal-electric-current determination step in which when the added numbers of times that the weight assignment is performed in the unit detection period is smaller than a first number of times and except for zero, the first weighting coefficient is assigned to the number of times that a sampled electric current having a value larger than the first threshold value is detected in a unit detection period following the unit detection period in terms of time, the second weighting coefficient is assigned to the number of times that a sampled electric current having a value smaller than the first threshold value and not smaller than the second threshold value is detected, and the numbers of times that the weight assignment is performed are added up so as to determine that an abnormal electric current is passing through the electric wire when the added numbers of times that the weight assignment is performed is larger than a second number of times. Thus, whether or not an abnormal electric current which will damage the electric wire is passing through the electric wire is determined.

Figure 10:
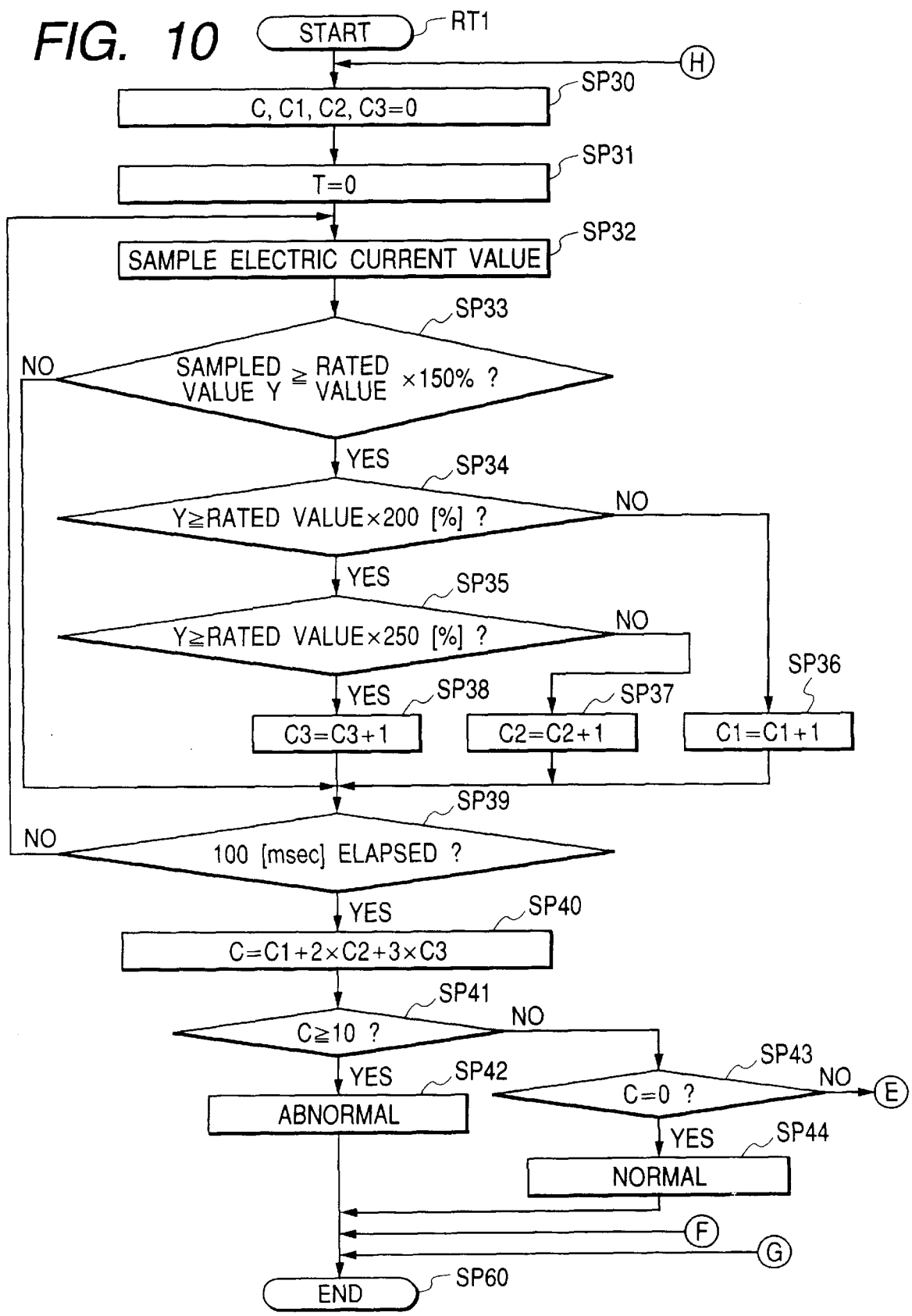
FIG. 10 is a flow chart of the microcomputer for detecting an abnormal electric current according to a second embodiment of the present invention.
Figure 11:
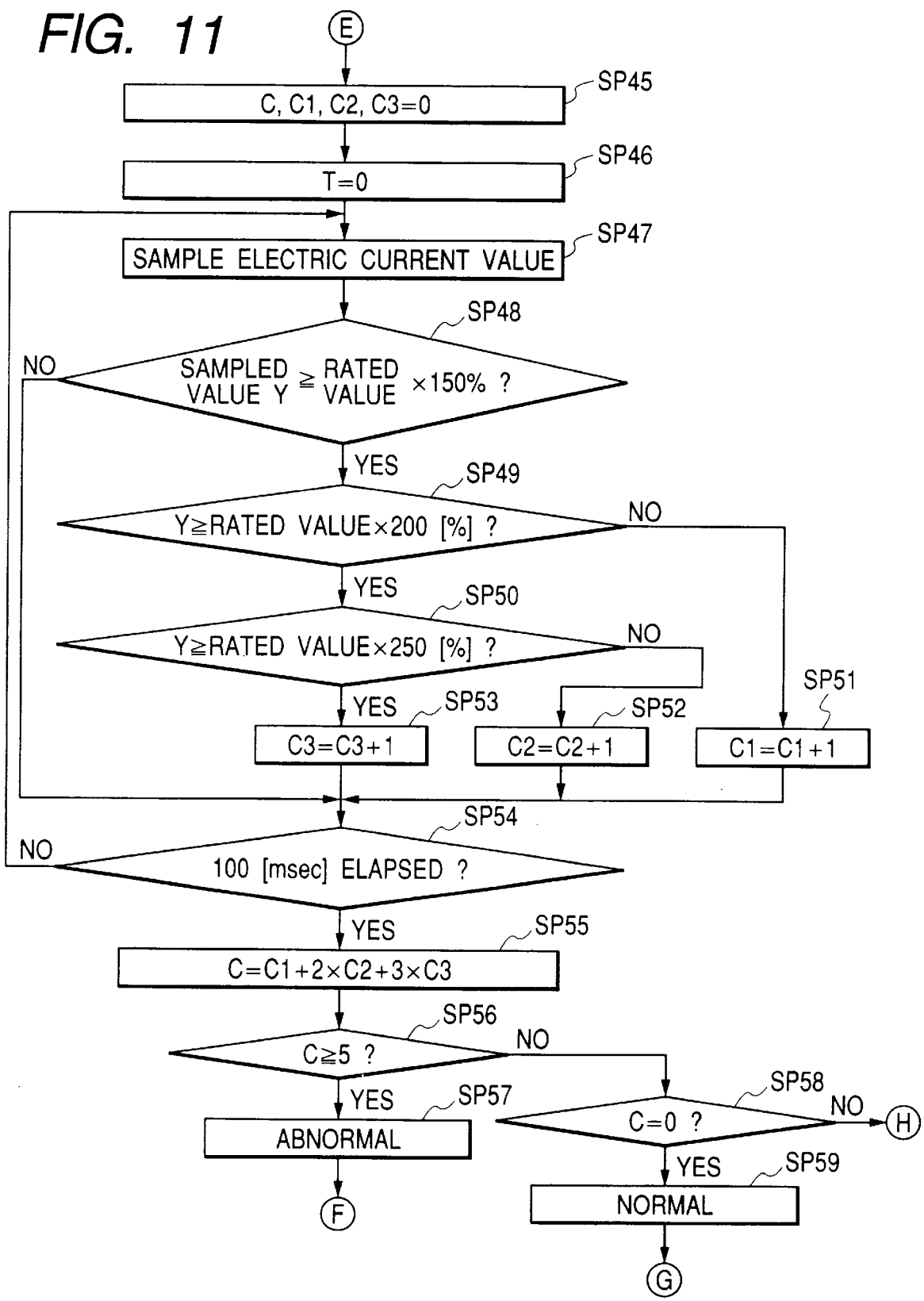
FIG. 11 is a flow chart of the microcomputer for detecting an abnormal electric current according to the second embodiment.

Specifically, routine RT1 of a process for detecting an abnormal electric current as shown in FIGS. 10 and 11 is performed so as to determine whether or not an abnormal electric current is passing through the electric wire. That is, the CPU 302 initially resets number of counts C, C1, C2 and C3 of the counter 304 in step SP30. In step SP31 the CPU 302 resets the internal timer so that an initial state is realized.

In step SP32 the CPU 302 samples supplied detected-current data D2A to D2X (in this embodiment, a case in which detected-current data D2X has been supplied will now be described) at predetermined intervals. In this embodiment, sampling is performed at intervals of 5 [msec].

In step SP33 whether or not the sample electric current value is not lower than 150% of the rated electric current (for example 10 [A]) is determined. If the value is not lower than 150%, the operation is shifted to step S34. If the value is smaller than 150%, the operation is shifted to step S39. In step SP34 whether or not the sampled electric current value is not lower than 200% is determined. If the value is not lower than 200%, the operation is shifted to step S35. If the value is lower than 200%, the operation is shifted to step S36. In step SP35 whether or not the sampled electric current value is not lower than 250% is determined. If the value is not lower than 250%, the operation is shifted to step S38. If the value is lower than 250%, the operation is shifted to step S37. In step SP36 the number of counts C1 is increased. In step SP37 the number of counts C2 is increased. In step SP38 the number of counts C3 is increased.

If the sampled electric current value is lower than 150%, the number of counts is not changed. If the value is not lower than 150% and lower than 200%, the number of counts C1 is increased. If the value is not lower than 200% and lower than 250%, the number of counts C2 is increased. If the value is not lower than 250%, the number of counts C3 is increased.

In step SP39 whether or not time T of the internal timer has reached 100 [msec] is determined. If time T does not reach 100 [msec], the operation returns to step SP32 so that the processes in steps SP32 to SP39 are again performed. If time T of the internal timer reaches 100 [msec], the operation proceeds to step SP40.

In step SP40 weights are assigned to the numbers of counts C1, C2 and C3 in accordance with the sampled electric current values. Moreover, the numbers of times that the weight assignment is performed are added up so that the number of times C that the weight assignment is performed is obtained. In this embodiment, weight "1" is assigned to the number of counts C1, weight "2" is assigned to the number of counts C2 and weight "3" is assigned to the number of counts C3. As a result, the number of times C that the weight assignment is performed is made to be a value reflecting the sampled electric current value in addition to the number of times of the excess currents.

In step SP41 whether or not the number of times C that the weight assignment is performed of the counter 304 is not smaller than 10 is determined. If the number of times C that the weight assignment is performed is not smaller than 10, it means passage of an abnormal electric current which will damage the wire 200A through the wire 200A. Therefore, the operation is shifted to step S42 so that abnormality determination is made. Then, the control signal S1A for instructing the protective circuit 55A to turn off the MOS FET 110 of the semiconductor switch portion 54A is transmitted to the protective circuit 55A so that supply of an electric current to the wire 200A is interrupted.

At this time, the CPU 302 transmits abnormality signal S4 to a display portion for displaying passage of an abnormal electric current. Thus, passage of the abnormal electric current through the wire 200A is displayed. After the process in step SP42 has been completed, the operation of the CPU 302 proceeds to step SP60 so that routine RT1 or the process for detecting an abnormal electric current in the wire 200A is completed.

If a negative result is obtained in step SP41, the operation of the CPU 302 is shifted to step SP43 to determine whether or not the number of times C that the weight assignment is performed is zero. If the number is zero, the operation proceeds to step SP44 so that no passage of an abnormal electric current is determined. Then, the operation proceeds to step SP60 so that the routine RT1 of a process for detecting an abnormal electric current is completed.

If a negative result is obtained in step SP43, that is, if the number of times C that the weight assignment is performed is 1 to 9, the CPU 302 determines that an abnormal electric current is passing through the wire 200A or noise is undesirably detected. Therefore, the CPU 302 is shifted to step SP45 to perform a process for detecting an abnormal electric current in a next detection period.

The CPU 302 initially resets the numbers of counts C, C1, C2 and C3 in step SP45. In step SP46 the CPU 302 resets the internal timers so that an initial state is realized. In step SP47 detected-current data D2A is sampled. In steps SP48 to SP55, processes similar to those in step SP33 to SP40 are performed so that the number of times C of the sampled excess currents in the detection period that the weight assignment is performed is obtained.

After the number of times C that the weight assignment is performed has been detected in step SP55, the CPU 302, in step SP56, determines whether or not the number of times C that the weight assignment is performed is not smaller than 5. If the number of times is not smaller than 5, the operation is shifted to step S57 so that a determination of passage of an abnormal electric current through the wire 200A is made similar to step SP42. Moreover, supply of an electric current to the wire 200A is interrupted and the abnormality is displayed on the display portion.

If a negative result is obtained in step SP56, the operation is shifted to step S58 so that a determination is made whether or not the number of times C that the weight assignment is performed is zero. If the number is zero, the operation is shifted to step S59 so that a determination is made that any abnormal electric current does not pass through the electric wire. Then, the operation proceeds to step SP60 so that the routine RT1 of the process for detecting an abnormal electric current is completed.

If the CPU 302 obtains a negative result in step SP58, that is, if the number of times C that the weight assignment is performed is 1 to 4, it means a fact that whether an abnormal electric current is passing through the wire 200A or noise has been undesirably detected cannot be determined. At this time, the CPU 302 is shifted to step SP30 so that the CPU 302 performs the process for detecting an abnormal electric current in a next detection process.

When the CPU 302 has completed the routine RT1 of the process for detecting an abnormal electric current in the wire 200A in accordance with the detected-current data D2A, the CPU 302 subjects the other electric wires 200B to 200X to the routine RT1 of the process for detecting an abnormal electric current in the wire 200A. Thus, whether or not an abnormal electric current is passing through each of the electric wires 200B to 200X is detected. If passage of an abnormal electric current is determined, supply of an electric current to the electric wire is interrupted and the abnormality is displayed. As a result, damage of each of the electric wires 200A to 200X can be prevented.

Similarly to the first embodiment, the CPU 302 does not subject electric wires of a type corresponding to a load, such as a lamp or a motor, through which a rush current passes when supply of electric power is started to the routine RT1 of the process for detecting an abnormal electric current until a predetermined period of time elapses from start of electric power. As a result, incorrect detection that the rush current is detected as an abnormal electric current can be prevented.

Referring to FIG. 12, the operation for detecting an abnormal electric current according to this embodiment will now be described. FIG. 12 is a graph shows passage of an abnormal electric current caused from an intermittent short circuit through an electric wire which is a subject of detection of an abnormal electric current. Initially, the CPU 302 performs the process for sampled electric current values in step SP32 (see FIG. 10) so as to sample detected-current data D2A or D2B to D2X at intervals of 5 [msec] at time indicated with an arrow. Then, the CPU 302 subjects the sampled electric current values to the process for determining an excess current in steps SP33 to SP35 to determine whether or not the sampled electric current value is an excess current. Moreover, the degree of excess current is classified.

Double circles indicate detection of sampled electric current values not lower than 250% of the rated electric current. Single circles indicate detection of a sampled electric current value not lower than 200% and lower than 250% of the rated electric current. Triangles indicate detection of a sampled electric current value not lower than 150% and lower than 200% of the rated electric current. Marks x indicate detection of a sampled electric current lower than 150% of the rated electric current.

Then, the CPU 302 detects the number of times C that the weight assignment is performed (corresponding to step SP40) by assigning individually weighting coefficients to the number of times of the double circles, that of the single circles and the number of triangles and by adding up the results. The illustrated case includes two double circles (corresponding to C3 in step SP40), five single circles (corresponding to C2 in step SP40) and five triangles (corresponding to C1 in step SP40). Therefore, the number of times C that the weight assignment is performed is obtained in such a manner that $C=3\times2+2\times5+1\times5=21$. Therefore, an affirmative result is obtained in step SP41, and an abnormal electric current is determined in step SP42.

In the example case shown in FIG. 12, the number of times C that the weight assignment is performed is not smaller than 10 in the first detection period A1. Therefore, passage of a abnormal electric current is determined. If the number of times C that the weight assignment is performed in the detection period is smaller than 10, the number of times C that the weight assignment is performed is again detected in the detection period A2 following the detection period A1. Then, whether or not the number of times C that the weight assignment is performed is not smaller than 5 is determined so as to determine whether or not an abnormal electric current is passing through the electric wire. If the number of times C that the weight assignment is performed which has been detected in the detection period A2 is 1 to 4, the number of times C that the weight assignment is performed is again detected in a detection period following the detection period A2. Then, whether or not the number of times C that the weight assignment is performed is not smaller than 10 is determined to determine whether or not an abnormal electric current is passing through the electric wire.

As described above, the second embodiment has the structure that the number of times C that the weight assignment is performed is used to which the sampled electric current value is reflected in addition to the number of the excess currents are reflected to determine an abnormal electric current. Therefore, there can be provided the method of detected an abnormal electric current in a vehicle and an apparatus for detecting an abnormal electric current in a vehicle which are capable of detecting all of abnormal electric currents which include the abnormal electric current caused from an intermittent short circuit and which will damage the electric and furthermore accurately detecting an abnormal electric current which will damage the electric wire and the power supply apparatus for a vehicle capable of preventing damage of an electric wire caused from the abnormal electric current.

(3) Other Embodiments

The above-mentioned embodiments are arranged in such a manner that the second number of times (five) which is the threshold value of the number of counts detected in the detection period A2 which is a latter period in terms of time is made to be smaller than the first number of times (ten) which is the threshold value of the number of counts detected previously. The present invention is not limited thereby. The second number of times may be the same as the first number of times. As an alternative to this, the second number of times may be larger than the first number of times.

In the foregoing embodiments, the first detection period A1 and the detection period A2 which is a later period in terms of time have the same length. For example, the detection period A2 may be shorter than the detection period A1. In this case, a process for determining an abnormal electric current can be performed similarly to the case where the second number of times is smaller than the first number of times even if the second number of times is made to be the same as the first number of times.

In the foregoing embodiments, the operations for detecting an abnormal electric current in all of the electric wire are arranged in such a manner that the first number of times is fixed to ten and the second number of times is fixed to five. The first and second numbers of times may arbitrarily be changed in accordance with the type of the electric wire and that of the load. In this case, the process for detecting an abnormal electric current can furthermore be performed in accordance with the damage characteristic of each electric wire. Thus, damage of the electric wire can furthermore reliably be prevented.

In the second embodiment, three threshold values which are 150%, 200% and 250% of the rated electric current are used to classify the sampled electric current values. The threshold values according to the present invention are not limited to the above-mentioned values.

In the above-mentioned embodiments, the program process which is performed by the CPU 302 realizes the sampling function for sampling detected electric current values at the sampling intervals, the comparison function for subjecting the sampled electric current value to a predetermined threshold value, the abnormality determination function and the function for switching on/off the switch. The present invention is not limited to the above-mentioned structure. As a matter of course, the above-mentioned functions may be realized by hardware.

As described above, according to the first and seventh aspects of the present invention, a method and an apparatus for detecting an abnormal electric current in a vehicle can be realized which are able to detect all of abnormal electric currents which including the abnormal electric current caused from a intermittent short circuit and which will damage the electric wire.

According to the second and eighth aspects of the present invention, a method and an apparatus for detecting an abnormal electric current in a vehicle can be realized which are able to furthermore reliably and quickly detect an abnormal electric current which will damage the electric wire.

According to the third and ninth aspects of the present invention, a method and an apparatus for detecting an abnormal electric current in a vehicle can be realized which are able to furthermore accurately detect an abnormal electric current which will damage the electric wire as compared with the method and apparatus for detecting an abnormal electric current of the first or seventh aspect because the determination of the abnormal electric current is made in accordance with the number of times $C\gamma$ that the weight assignment is performed which is obtained by adding up weights in accordance with the level of the sampled electric currents.

According to the fourth and tenth aspects of the present invention, a method and an apparatus for detecting an abnormal electric current in a vehicle can be realized which are able to detect only an electric current which will damage the electric wire while preventing an incorrect determination that a rush current is determined as an abnormal electric current in addition to the effects obtainable from the effects of the first to third and seventh to ninth aspects of the invention.

According to the fifth and eleventh aspects of the present invention, a method and an apparatus for detecting an abnormal electric current in a vehicle can be realized which are able to furthermore improve the accuracy in detecting an abnormal electric current in addition to the effects of the first to fourth and seventh to tenth aspects of the invention.

According to the sixth and twelveth aspects of the present invention, a method and an apparatus for detecting an abnormal electric current in a vehicle can be realized which are able to perform a further accurate process for detecting an abnormal electric current in accordance with the damage characteristic of the electric wire in addition to the effects of the first to fifth and seventh to eleventh aspects of the invention.

According to the thirteenth aspect of the present invention, a power supply apparatus for a vehicle can be realized which is able to reliably prevent damage of an electric wire and which exhibits excellent reliability.

According to the fourteenth aspect of the present invention, a power supply apparatus for a vehicle can be realized which is able to furthermore reliably prevent damage of an electric wire and which exhibits further improved reliability as compared with the thirteenth.

According to the fifteenth aspect of the present invention, a power supply apparatus for a vehicle can be realized which is able to prevent a malfunction that supply of electric power to the load is undesirably inhibited if a rush current passes the electric wire and which is able to furthermore satisfactorily supply electric power in addition to the effects of the thirteenth and fourteenth aspects.

According to the sixteenth aspect of the present invention, a power supply apparatus can be realized which is able to furthermore improve the accuracy in detecting an abnormal electric current and which is able to furthermore reliably prevent damage of an electric wire in addition to the effects of the thirteenth and fifteenth aspects.

According to the seventeenth aspect of the present invention, a power supply apparatus for a vehicle can be realized which is able to perform a further accurate process for detecting an abnormal electric current in accordance with the damage characteristic of the electric wire and which is able to furthermore reliably prevent damage of the electric wire in addition to the effects of the thirteenth to sixteenth aspects of the invention.

What is claimed is:

1. A method of detecting an abnormal electric current passing through an electric connection between a load to which electric power is supplied and a power source, the method comprising the steps of:

(a) detecting values of electric currents which pass through the electric connection at predetermined sampling intervals;

(b) counting the number of times in a first unit detection period that a sampled electric current having a value larger than a predetermined value is detected and determining that a passage of an abnormal electric current has occurred through the electric connection when the number of counts is larger than a first number of times; and (c) counting the number of times that the sampled electric current having the value larger than the predetermined value is detected in a second unit detection period, said second unit detection period being after the first unit detection period in terms of times in a case where the number of counts is smaller than the first number of times and is not zero, and determining that the passage of the abnormal electric current has occurred through the electric connection when the number of counts is larger than a second number of times.

2. The method of detecting an abnormal electric current according to claim 1, wherein when the number of counts in the unit detection period in the first determining step (b) or second determining step (c) is zero, a determination is made that the abnormal electric current is not passing through the electric connection, and when the number of counts in the second determining step is smaller than the second number of times and is not zero, processes similar to the first determining step (b) and the second determining step (c) are repeated in unit detection periods following the second unit detection period in the second determining step (c).

3. The method of detecting an abnormal electric current according to claim 1, wherein the processes in the first determining step (b) and second determining step (c) are not performed until a predetermined period of time elapses from the moment in time at which supply of electric power to the load has been started, and the first determining step (b) and second determining step (c) are performed after the predetermined period of time has elapsed.

4. The method of detecting an abnormal electric current according to claim 1, wherein the second number of times in the second determining step (b) is smaller than the first number of times.

5. The method of detecting an abnormal electric current according to claim 1, wherein the first and second numbers of times are determined in consideration of a damage characteristic of the electric connection.

6. A method of detecting an abnormal electric current passing through an electric connection between a load to which electric power is supplied and a power source, the method comprising the steps of:

(a) detecting values of electric currents which pass through the electric connection at predetermined sampling intervals;

(b) assigning a first weighting coefficient to the number of times that a sampled electric current having a value larger than a first threshold value is detected in a first unit detection period, assigning a second weighting coefficient smaller than the first weighting coefficient to the number of times that a sampled electric current having a value smaller than the first threshold value and not smaller than a second threshold value the second threshold value being smaller than the first threshold value, is detected, adding up the numbers of times that weight assignment is performed, and determining that an abnormal electric current is passing through the electric connection when the added numbers of times that the weight assignment is performed are larger than a first number of times; and (c) when the added numbers of times that the weight assignment is performed in the first unit detection period is smaller than a first number of times and is not zero, assigning the first weighting coefficient to the number of times that a sampled electric current having a value larger than the first threshold value is detected in a second unit detection period following the first unit detection period in terms of time, assigning the second weighting coefficient to the number of times that a sampled electric current having a value smaller than the first threshold value and not smaller than the second threshold value is detected, adding up the numbers of times that the weight assignment is performed, and determining that an abnormal electric current is passing through the electric wire when the added numbers of times that the weight assignment is performed is larger than a second number of times.

7. The method of detecting an abnormal electric current according to claim 6, wherein when the number of counts in the first unit detection period in the first determining step (b) or the second determining step (c) is zero, a determination is made that the abnormal electric current is not passing through the electric connection, and when the number of counts in the second determining step is smaller than the second number of times and is not zero, processes similar to the first determining step (b) and the second determining step (c) are repeated in unit detection period following the second unit detection period in the second determining step (c).

8. The method of detecting an abnormal electric current according to claim 6, wherein the processes in the first determining step (b) and the second determining step (c) are not performed until a predetermined period of time elapses from the moment in time at which supply of electric power to the load has been started, and the first determining step (b) and the second determining step (c) are performed after the predetermined period of time has elapsed.

9. The method of detecting an abnormal electric current according to claim 6, wherein the second number of times in the second determining step (b) is smaller than the first number of times.

10. The method of detecting an abnormal electric current according to claim 6, wherein the first and second number of times are determined in consideration of a damage characteristic of the electric connection.

11. An apparatus for detecting an abnormal electric current passing through an electric connection when electric power is supplied from a power source portion to a load through the electric connection, the apparatus comprising:

electric-current detection means for detecting an electric current value which is passing through the electric connection;

sampling means for sampling the detected electric current values at predetermined sampling intervals;

comparison means for subjecting each sampled electric current value and a predetermined threshold value to a comparison;

a counter for counting the number of times that the sampled electric current values are larger than the predetermined threshold value in each predetermined period of time; and abnormality determination means for determining that a passage of an abnormal electric current through the electric connection has occurred, when the number of counts in a certain period of time in each of the predetermined periods of time is not smaller than a first number of times, and determining that the passage of an abnormal electric current through the electric connection has occurred, when the number of counts in the certain detection period is smaller than the first number of times and is not zero and when a number of counts in a period of time following the certain period of time in terms of time is larger than a second number of times.

12. The apparatus for detecting an abnormal electric current according to claim 7, wherein the abnormality determination means determines that no abnormal electric current is passing through the electric connection when the number of counts in the certain period of time or the number of counts in the period of time following the certain period of time in terms of time is zero and repeats the abnormal-electric-current determination in accordance with the number of counts in the latter period of time when the number of counts in the period of time following the certain period of time in terms of time is smaller than the second number of times and is not zero.

13. The apparatus for detecting an abnormal electric current according to claim 11, wherein the determination of the abnormal electric current is not performed until a predetermined period of time elapses from the moment in time at which supply of electric power to the load has been started.

14. The apparatus for detecting an abnormal electric current according to claim 11, wherein the second number of times is smaller than the first number of times.

15. The apparatus for detecting an abnormal electric current according to claim 11, wherein the first and second numbers of times are determined in consideration of a damage characteristic of the electric connection.

16. An apparatus for detecting an abnormal electric current passing through an electric connection when electric power is supplied from a power source portion to a load through the electric connection, the apparatus comprising:

electric-current detection means for detecting an electric current value which is passing through the electric connection;

sampling means for sampling the detected electric current values at predetermined sampling intervals;

comparison means for subjecting each sampled electric current value, a first threshold value and a second threshold value smaller than the first threshold value to comparisons;

first and second counters for counting the number of times of the sampled electric current values not smaller than the first threshold value and the number of times of the sampled electric current values smaller than the first threshold value and not smaller than the second threshold value respectively in each predetermined period of time;

weight addition means for assigning a first weighting coefficient to the number of times counted by the first counter, assigning a second weighting coefficient smaller than the first weighting coefficient to the number of times counted by the second counter and adding up the numbers of times that the weight assignment is performed; and abnormality determination means for determining passage of an abnormal electric current through the electric wire when the number of times that the weight assignment is performed in a certain period of time is not smaller than a first number of times and determining passage of an abnormal electric current through the electric wire when the number of times that the weight assignment is performed in the certain detection period is smaller than the first number of times and is not zero and when a number of times that the weight assignment is performed in a period of time following the certain period of time in terms of time is larger than a second number of times.

17. The apparatus for detecting an abnormal electric current according to claim 16, wherein the abnormality determination means determines that no abnormal electric current is passing through the electric connection when the number of counts in the certain period of time in terms of time is zero and repeats the abnormal-electric-current determination in accordance with the number of counts in the latter period of time when the number of time following the certain period of time in terms of time is smaller than the second number of times and is not zero.

18. The apparatus for detecting an abnormal electric current according to claim 16, wherein the determination of the abnormal electric current is not performed until a predetermined period of time elapses from the moment in time at which supply of electric power to the load has been started.

19. The apparatus for detecting an abnormal electric current according to claim 16, wherein the second number of times is smaller than the first number of times.

20. The apparatus for detecting an abnormal electric current according to claim 16, wherein the first and second number of times are determined in consideration of a damage characteristic of the electric connection.

21. A power supply apparatus arranged such that electric power is supplied from a power source portion to a load through an electric connection, the power supply apparatus comprising:

electric-current detection means for detecting an electric current value which is passing through the electric connection;

sampling means for sampling the detected electric current values at predetermined sampling intervals;

comparison means for subjecting each sampled electric current value and a predetermined threshold value to a comparison;

a counter for counting the number of times that the sampled electric current values are larger than the predetermined value in each predetermined period of time;

abnormality determination means for determining passage of an abnormal electric current through the electric connection when the number of counts in a certain period of time in each of the predetermined periods of time is not smaller than a first number of times and determining passage of an abnormal electric current through the electric wire when the number of counts in the certain detection period is smaller than the first number of times and is not zero and when a number of counts in a period of time following the certain period of time in terms of time is larger than a second number of times; and control means for interrupting an electric current which passes through the electric connection by switching off a switch, provided on the electric connection for establishing the connection between the power source portion and the loads when passage of the abnormal electric current has been determined by the abnormality determination means.

22. The power supply apparatus according to claim 21, wherein the switch is not switched off by the control means until a predetermined period of time elapses from the moment in time at which supply of electric power to the load has been started.

23. The power supply apparatus according to claim 21, wherein the second number of times is smaller than the first number of times.

24. The power supply apparatus according to claim 21, wherein the first and second numbers of times are determined in consideration of a damage characteristic of the electric connection.

25. A power supply apparatus arranged such that electric power is supplied from a power source portion to a load through an electric connection, the power supply apparatus comprising:

electric-current detection means for detecting an electric current value which is passing through the electric connection;

sampling means for sampling the detected electric current values at predetermined sampling intervals;

comparison means for subjecting each sampled electric current value, a first threshold value and a second threshold value to comparisons;

counters for counting the number of times that the sampled electric current values are not smaller than the first threshold value and the number of times that the sampled electric current values are not smaller than the second threshold value, respectively, the second threshold value being smaller than the first threshold value;

weight addition means for assigning a first weighting coefficient to the number of times that the sampled electric current values are larger than the first threshold value, assigning a second weighting coefficient smaller than the first weighting coefficient to the number of times that the sampled electric current values are smaller than the first threshold value and not smaller than the second threshold value and adding up the number of times that the weight assignment is performed;

abnormality determination means for determining passage of an abnormal electric current through the electric connection when the number of counts in a certain period of time is not smaller than a first number of times and determining passage of an abnormal electric current through the electric connection when the number of counts in the certain detection period is smaller than the first number of times and is not zero and when a number of counts in a period of time following the certain period of time in terms of time is larger than a second number of times; and control means for interrupting an electric current which passes through the electric connection by switching off a switch, provided on the electric connection for establishing the connection between the power source portion and the load, when passage of the abnormal electric current has been determined by the abnormality determination means.

26. The power supply apparatus according to claim 25, wherein the switch is not switched off by the control means until a predetermined period of time elapses from the moment in time at which supply of electric power to the load has been started.

27. The power supply apparatus according to claim 25, wherein the second number of times is smaller than the first number or times.

28. The power supply apparatus according to claim 25, wherein the first and second number of times are determined in consideration of a damage characteristic of the electric connection.

29. An apparatus for detecting an abnormal electric current passing through an electric connection when electric power is supplied from a power source portion to a load through the electric connection, the apparatus comprising:

an electric-current detector which detects an electric current value which is passing through the electric connection;

a sampling circuit which samples the detected electric current values at predetermined sampling intervals;

a comparison circuit which subjects each sampled electric current value and a predetermined threshold value to a comparison;

a counter for counting the number of times that the sampled electric current values are larger than the predetermined threshold value in each predetermined period of time; and an abnormality determination circuit which determines that a passage of an abnormal electric current through the electric connection has occurred, when the number of counts in a certain period of time in each of the predetermined periods of time is not smaller than a first number of times, and determines that the passage of an abnormal electric current through the electric connection has occurred, when the number of counts in the certain detection period is smaller than the first number of times and is not zero and when a number of counts in a period of time following the certain period of time in terms of time is larger than a second number of times.

30. The apparatus for detecting an abnormal electric current according to claim 29, wherein the abnormality determination circuit determines that no abnormal electric current is passing through the electric connection when the number of counts in the certain period of time in terms of time is zero and repeats the abnormal-electric-current determination in accordance with the number of counts in the latter period of time when the number of time following the certain period of time in terms of time is smaller than the second number of times and is not zero.

31. The apparatus for detecting an abnormal electric current according to claim 29, wherein the determination of the abnormal electric current is not performed until a predetermined period of time elapses from the moment in time at which supply of electric power to the load has been started.

32. The apparatus for detecting an abnormal electric current according to claim 29, wherein the second number of times is smaller than the first number of times.

33. The apparatus for detecting an abnormal electric current according to claim 29, wherein the first and second number of times are determined in consideration of a damage characteristic of the electric connection.

34. An apparatus for detecting an abnormal electric current passing through an electric connection when electric power is supplied from a power source portion to a load through the electric connection, the apparatus comprising:

an electric-current detector which detects an electric current value which is passing through the electric connection;

a sampling circuit which samples the detected electric current values at predetermined sampling intervals;

a comparison circuit which subjects each sampled electric current value, a first threshold value and a second threshold value smaller than the first threshold value to comparisons;

first and second counters for counting the number of times of the sampled electric current values not smaller than the first threshold value and the number of times of the sampled electric current values smaller than the first threshold value and not smaller than the second threshold value respectively in each predetermined period of time;

an adder which assigns a first weighting coefficient to the number of times counted by the first counter, assigns a second weighting coefficient smaller than the first weighting coefficient to the number of times counted by the second counter and adds up the numbers of times that the weight assignment is performed; and an abnormality determination circuit which determines passage of an abnormal electric current through the electric wire when the number of times that the weight assignment is performed in a certain period of time is not smaller than a first number of times, and determines passage of an abnormal electric current through the electric wire when the number of times that the weight assignment is performed in the certain detection period is smaller than the first number of times and is not zero and when a number of times that the weight assignment is performed in a period of time following the certain period of time in terms of time is larger than a second number of times.

35. The apparatus for detecting an abnormal electric current according to claim 34, wherein the abnormality determination circuit determines that no abnormal electric current is passing through the electric connection when the number of counts in the certain period of time in terms of time is zero and repeats the abnormal-electric-current determination in accordance with the number of counts in the latter period of time when the number of time following the certain period of time in terms of time is smaller than the second number of times and is not zero.

36. The apparatus for detecting an abnormal electric current according to claim 34, wherein the determination of the abnormal electric current is not performed until a pre-determined period of time elapses from the moment in time at which supply of electric power to the load has been started.

37. The apparatus for detecting an abnormal electric current according to claim 34, wherein the second number of times is smaller than the first number of times.

38. The apparatus for detecting an abnormal electric current according to claim 34, wherein the first and second number of times are determined in consideration of a damage characteristic of the electric connection.

39. A power supply apparatus arranged such that electric power is supplied from a power source portion to a load through an electric connection, the power supply apparatus comprising:

an electric-current detector which detects an electric current value which is passing through the electric connection;

a sampling circuit which samples the detected electric current values at predetermined sampling intervals;

a comparison circuit which subjects each sampled electric current value and a predetermined threshold value to a comparison;

a counter for counting the number of times that the sampled electric current values are larger than the predetermined value in each predetermined period of time;

an abnormality determination circuit which determines passage of an abnormal electric current through the electric connection when the number of counts in a certain period of time in each of the predetermined periods of time is not smaller than a first number of times, and determines passage of an abnormal electric current through the electric wire when the number of counts in the certain detection period is smaller than the first number of times and is not zero and when a number of counts in a period of time following the certain period of time in terms of time is larger than a second number of times; and a controller which interrupts an electric current which passes through the electric connection by switching off a switch, provided on the electric connection for establishing the connection between the power source portion and the load, when passage of the abnormal electric current has been determined by the abnormality determination circuit.

40. The power supply apparatus according to claim 39, wherein the switch is not switched off by the controller until a predetermined period of time elapses from the moment in time at which supply of electric power to the load has been started.

41. The power supply apparatus according to claim 39, wherein the second number of times is smaller than the first number of times.

42. The power supply apparatus according to claim 39, wherein the first and second number of times are determined in consideration of a damage characteristic of the electric connection.

43. A power supply apparatus arranged such that electric power is supplied from a power source portion to a load through an electric connection, the power supply apparatus comprising:

an electric-current detector which detects an electric current value which is passing through the electric connection;

a sampling circuit which samples the detected electric current values at predetermined sampling intervals;

a comparison circuit which subjects each sampled electric current value, a first threshold value and a second threshold value to comparisons;

counters for counting the number of times that the sampled electric current values are not smaller than the first threshold value and the number of times that the sampled electric current values are not smaller than the second threshold value, respectively, the second threshold value being smaller than the first threshold value;

an adder which assigns a first weighting coefficient to the number of times that the sampled electric current values are larger than the first threshold value, assigns a second weighting coefficient smaller than the first weighting coefficient to the number of times that the sampled electric current values are smaller than the first threshold value and not smaller than the second threshold value, and adds up the number of times that the weight assignment is performed;

an abnormality determination circuit which determines passage of an abnormal electric current through the electric connection when the number of counts in a certain period of time is not smaller than a first number of times, and determines passage of an abnormal electric current through the electric connection when the number of counts in the certain detection period is smaller than the first number of times and is not zero and when a number of counts in a period of time following the certain period of time in terms of time is larger than a second number of times; and a controller which interrupts an electric current which passes through the electric connection by switching off a switch, provided on the electric connection for establishing the connection between the power source portion and the load, when passage of the abnormal electric current has been determined by the abnormality determination circuit.

44. The power supply apparatus according to claim 43, wherein the switch is not switched off by the controller until a predetermined period of time elapses from the moment in time at which supply of electric power to the load has been started.

45. The power supply apparatus according to claim 21, wherein the second number of times is smaller than the first number of times.

46. The power supply apparatus according to claim 21, wherein the first and second number of times are determined in consideration of a damage characteristic of the electric connection.

* * * * *